US011460580B2

(12) United States Patent
Schroeter

(10) Patent No.: US 11,460,580 B2
(45) Date of Patent: Oct. 4, 2022

(54) NEAREST NEIGHBOR SEARCH USING COMPRESSED OCTREES REPRESENTING HIGH DEFINITION MAPS FOR AUTONOMOUS VEHICLES

(71) Applicant: DeepMap Inc., Palo Alto, CA (US)

(72) Inventor: Derik Schroeter, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 184 days.

(21) Appl. No.: 16/904,238

(22) Filed: Jun. 17, 2020

(65) Prior Publication Data
US 2020/0393567 A1 Dec. 17, 2020

Related U.S. Application Data

(60) Provisional application No. 62/862,580, filed on Jun. 17, 2019.

(51) Int. Cl.
| G06F 16/2457 | (2019.01) |
| G06F 16/29 | (2019.01) |
| G01S 17/894 | (2020.01) |
| G06F 16/22 | (2019.01) |
| G01C 21/16 | (2006.01) |

(Continued)

(52) U.S. Cl.
CPC ............ *G01S 17/894* (2020.01); *G01C 21/16* (2013.01); *G01S 17/933* (2013.01); *G01S 19/01* (2013.01); *G06F 16/2246* (2019.01); *G06F 16/24575* (2019.01); *G06F 16/29* (2019.01)

(58) Field of Classification Search
CPC .. G06F 16/29; G06F 16/9538; G06F 16/2246; G06F 16/24575; G01S 17/894; G01S 17/933; G01S 19/01; G01C 21/16
See application file for complete search history.

(56) References Cited

U.S. PATENT DOCUMENTS

| 2007/0250476 A1* | 10/2007 | Krasnik | ............... | G06F 16/2246 707/999.002 |
| 2008/0052298 A1* | 2/2008 | Yeh | ..................... | G06F 16/9027 707/999.1 |
| 2013/0023503 A1 | 9/2013 | Karras | | |

(Continued)

OTHER PUBLICATIONS

U.S. Appl. No. 16/904,259, filed Jun. 17, 2020.
M. Botsch, A. Wiratanaya, L. Kobbelt, "Efficient High Quality Rendering of Point Sampled Geometry", Thirteenth Eurographics Workshop on Rendering, Jul. 2002.

(Continued)

*Primary Examiner* — Yuk Ting Choi
(74) *Attorney, Agent, or Firm* — Maschoff Brennan

(57) ABSTRACT

According to an aspect of an embodiment, operations may comprise receiving a search query for points near a query-point, accessing a compressed octree representation of a point cloud comprising 3D points of a region, and traversing the compressed octree representation to identify regions that overlap a search space by, marking a current node as overlapping the search space responsive to determining that the current node is a leaf node, identifying a child node of the current node and performing a nearest neighbor search in the child node responsive to determining that a region represented by the current node overlaps the search space, and identifying a sibling node of the current node and performing the nearest neighbor search in the sibling node responsive to determining that a region represented by the current node does not overlap the search space.

24 Claims, 18 Drawing Sheets

(51) Int. Cl.
G01S 17/933 (2020.01)
G01S 19/01 (2010.01)

(56) References Cited

U.S. PATENT DOCUMENTS

| | | | |
|---|---|---|---|
| 2014/0358960 A1* | 12/2014 | Levi | G06F 16/24558 707/769 |
| 2019/0013940 A1 | 5/2019 | Alam et al. | |
| 2019/0139403 A1* | 5/2019 | Alam | G01C 21/32 707/769 |
| 2020/0089968 A1* | 3/2020 | Lu | G01S 17/89 707/769 |
| 2021/0004993 A1* | 1/2021 | Sugio | G06T 9/40 707/769 |

OTHER PUBLICATIONS

R. Schnabel, R. Klein, "Octree-based Point-Cloud Compression", Eurographics Symposium on Point-Based Graphics, Jul. 2006.
J. Peng, C.-C. Jay Kuo, "Geometry-guided Progressive Lossless 3D Mesh Coding with Octree (OT) Decomposition", ACM Transactions on Graphics, vol. 24/3, Jul. 2005.
Julius Kammerl, "Point Cloud Compression for the Point Cloud Library (PCL)", YouTube video, intern presentation, https://www.youtube.com/watch?v=DLvO0b2NBXE, published on May 22, 2011.
GitHub, Google/Draco, https://github.com/google/draco retrieved on Jun. 15, 2020.
Written Opinion of the International Searching Authority dated Sep. 3, 2020 as received in Application No. PCT/US2020/038250.

* cited by examiner

# NEAREST NEIGHBOR SEARCH USING COMPRESSED OCTREES REPRESENTING HIGH DEFINITION MAPS FOR AUTONOMOUS VEHICLES

CROSS-REFERENCE TO RELATED APPLICATIONS

This patent application claims the benefit of and priority to U.S. Provisional App. No. 62/862,580 filed Jun. 17, 2019, which is incorporated by reference in the present disclosure in its entirety for all that it discloses. This application is also related to U.S. Provisional App. No. 62/862,385 filed Jun. 17, 2019, which is incorporated by reference in the present disclosure in its entirety for all that it discloses.

FIELD

The embodiments discussed herein are related to maps for autonomous vehicles, and more particularly storing high definition maps using compressed octrees and performing nearest neighbor search using the compressed octree data structure.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise receiving a search query for points near a query-point, the search query specifying a search space comprising the query-point and a search range. The operations may also comprise accessing a compressed octree representation of a point cloud comprising three-dimensional (3D) points of a region, the compressed octree representation comprising nodes, at least some of the nodes storing a sibling link to a sibling node having the same parent node. The operations may also comprise traversing the compressed octree representation to identify regions that overlap the search space by responsive to determining that a current node is a leaf node, marking the node as overlapping the search space, responsive to determining that a region represented by the current node overlaps the search space, identifying a child node of the current node and performing a nearest neighbor search in the child node, and responsive to determining that a region represented by the current node does not overlap the search space, identifying a sibling node of the current node using the sibling link and performing the nearest neighbor search in the sibling node. The operations may also comprise identifying a nearest neighbor node in a set of leaf nodes identified as overlapping the search space. The operations may also comprise using the nearest neighbor node for performing an operation on the point cloud.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
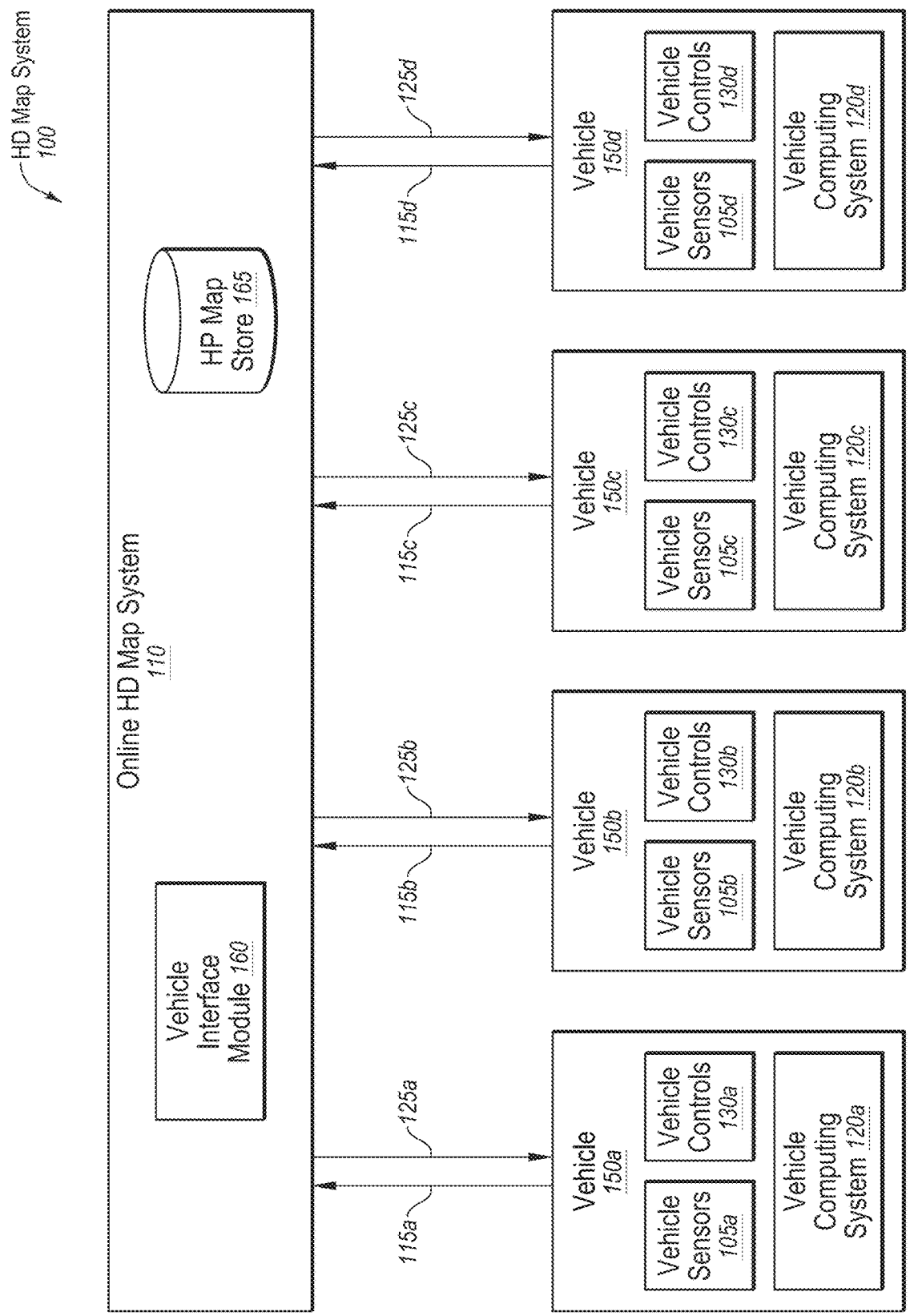
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may perform a nearest neighbor search using a compressed octree representation of a point cloud. For example, a nearest neighbor query may receive a point and a search radius (for example, a 40 cm radius or a 50 cm radius) as input and may identify points near the input point that are within the search radius. Neighbors that are at a distance greater than the input radius may be ignored and not returned as a result. The nearest neighbor search may be performed for localization, for example, for determining the pose of a vehicle. In some embodiments, an online HD map system may receive a request from a vehicle computing system for an HD map of a region and, instead of providing the relatively large HD map, may provide a compressed representation of the region based on an octree. The vehicle computing system may use the compressed representation of the region based on the octree for performing a nearest neighbor search. Accordingly, nearest neighbor searches may be performed directly on the compressed version without having to decompress it to recreate the 3D point cloud. The compressed representation of the region based on the octree may therefore be efficient for transmission and storage.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
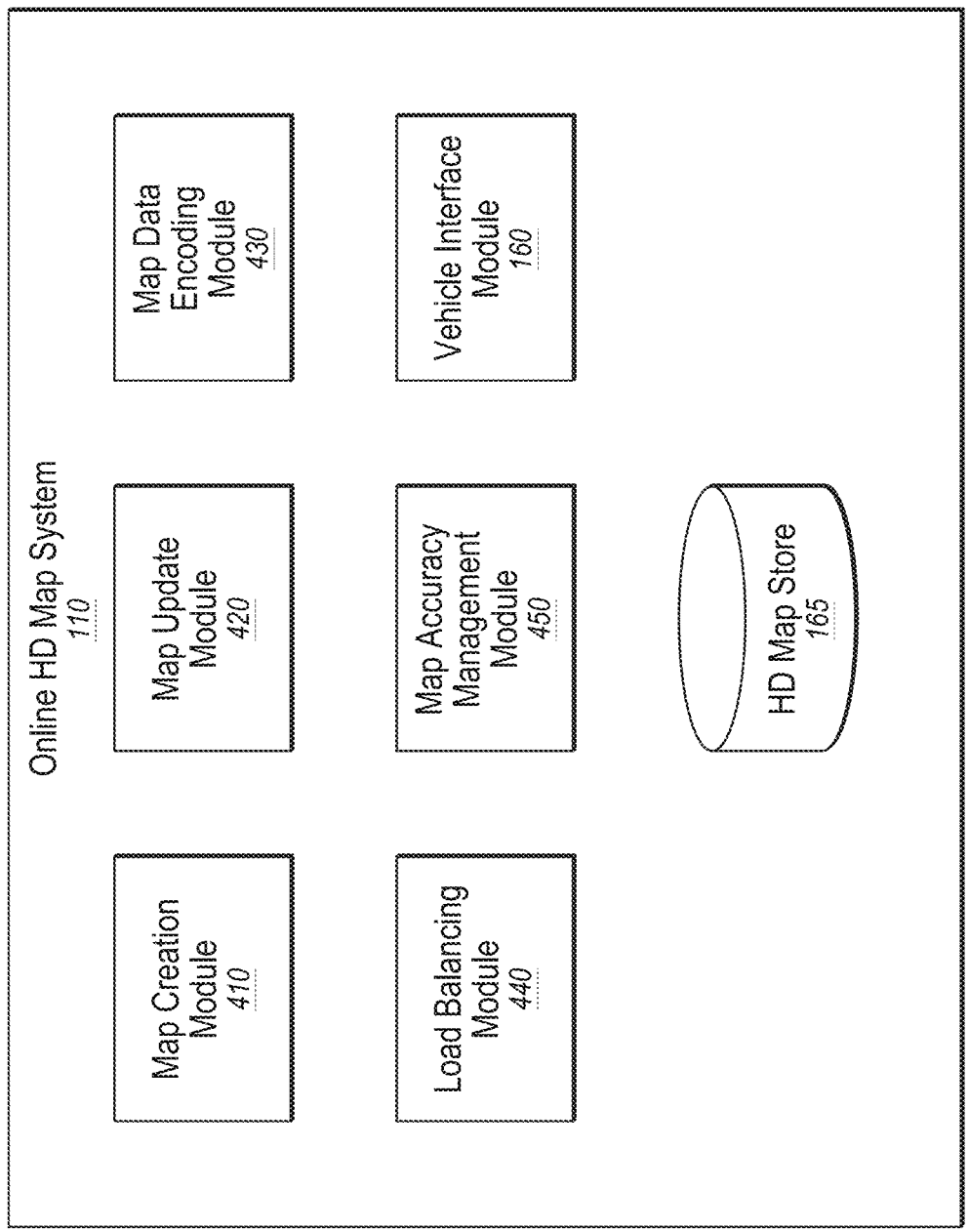
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
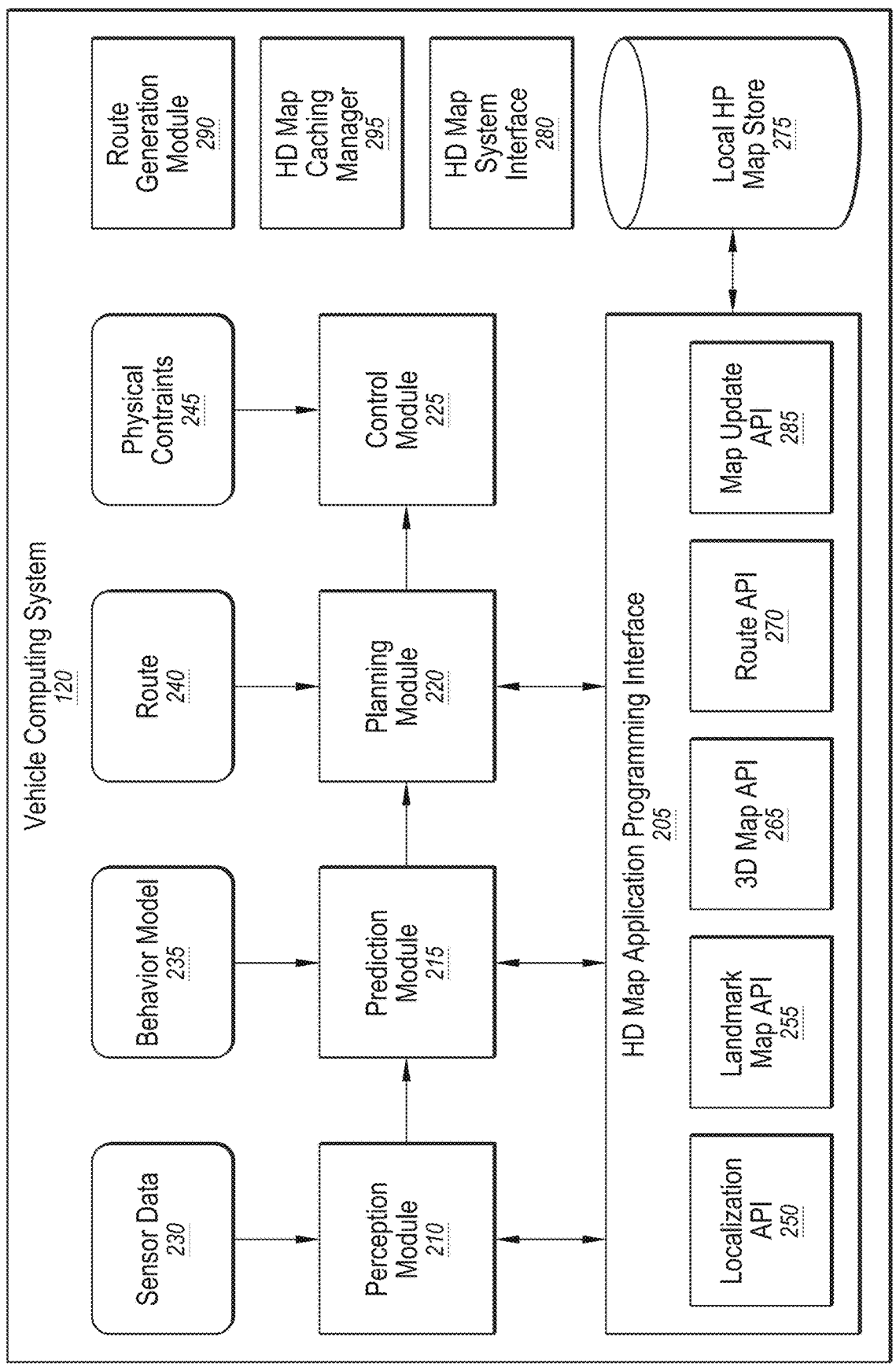
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a route generation module 290, an HD map caching manager 295, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next.

The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, a localization module 460, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
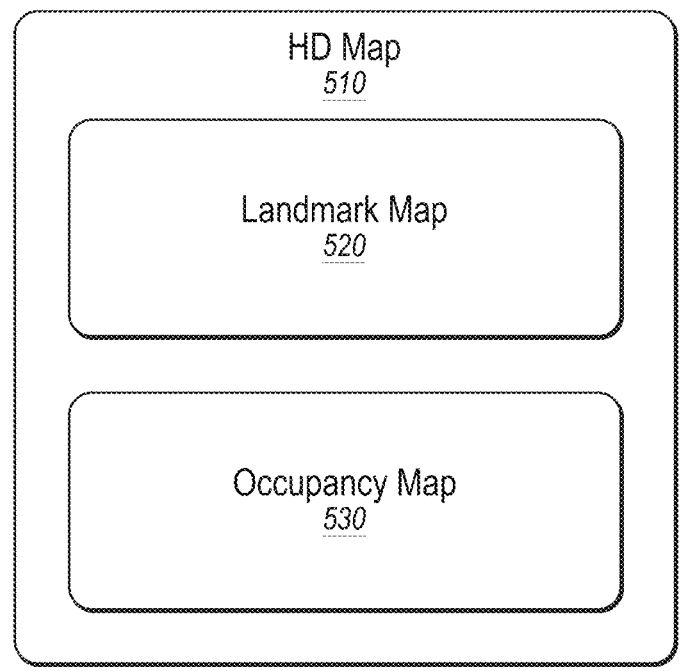
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high precision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
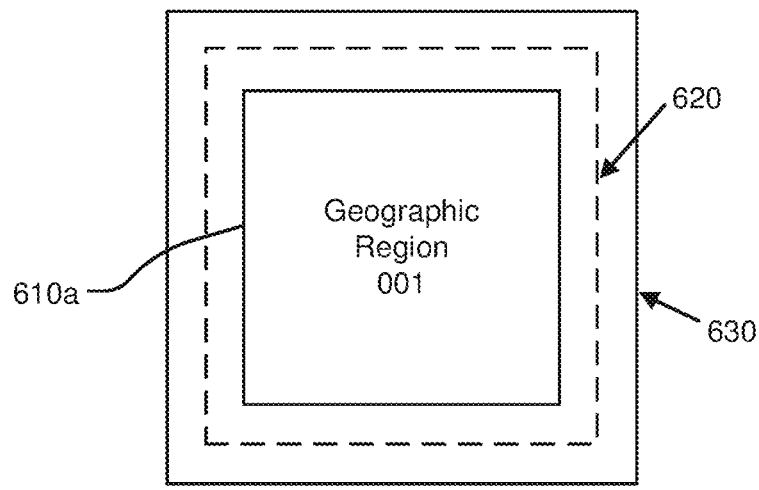
FIGS. 6A-6B illustrate example geographical regions defined in an HD map.
Figure 6B:
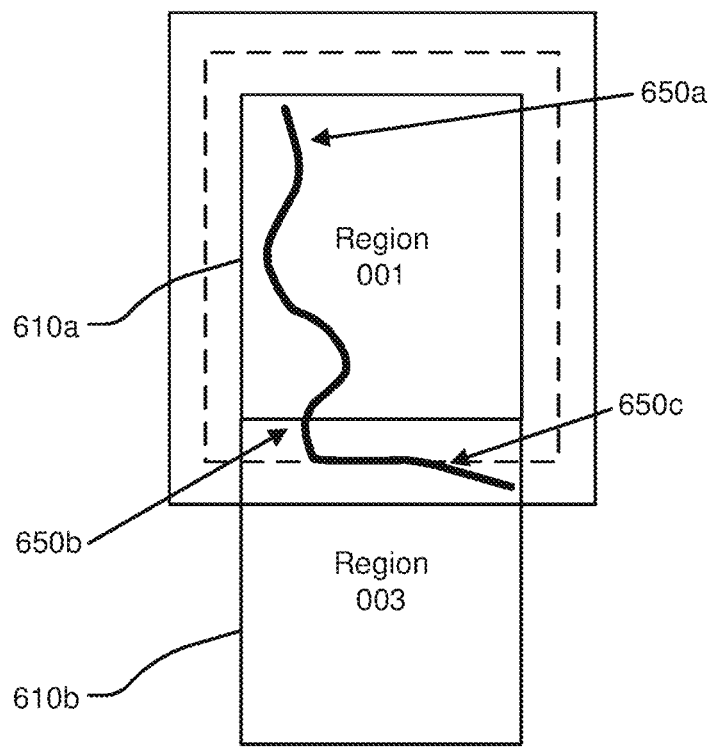

FIGS. 6A-6B illustrate example geographical regions 610a and 610b that may be defined in an HD map according to one or more embodiments. FIG. 6A illustrates a square geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
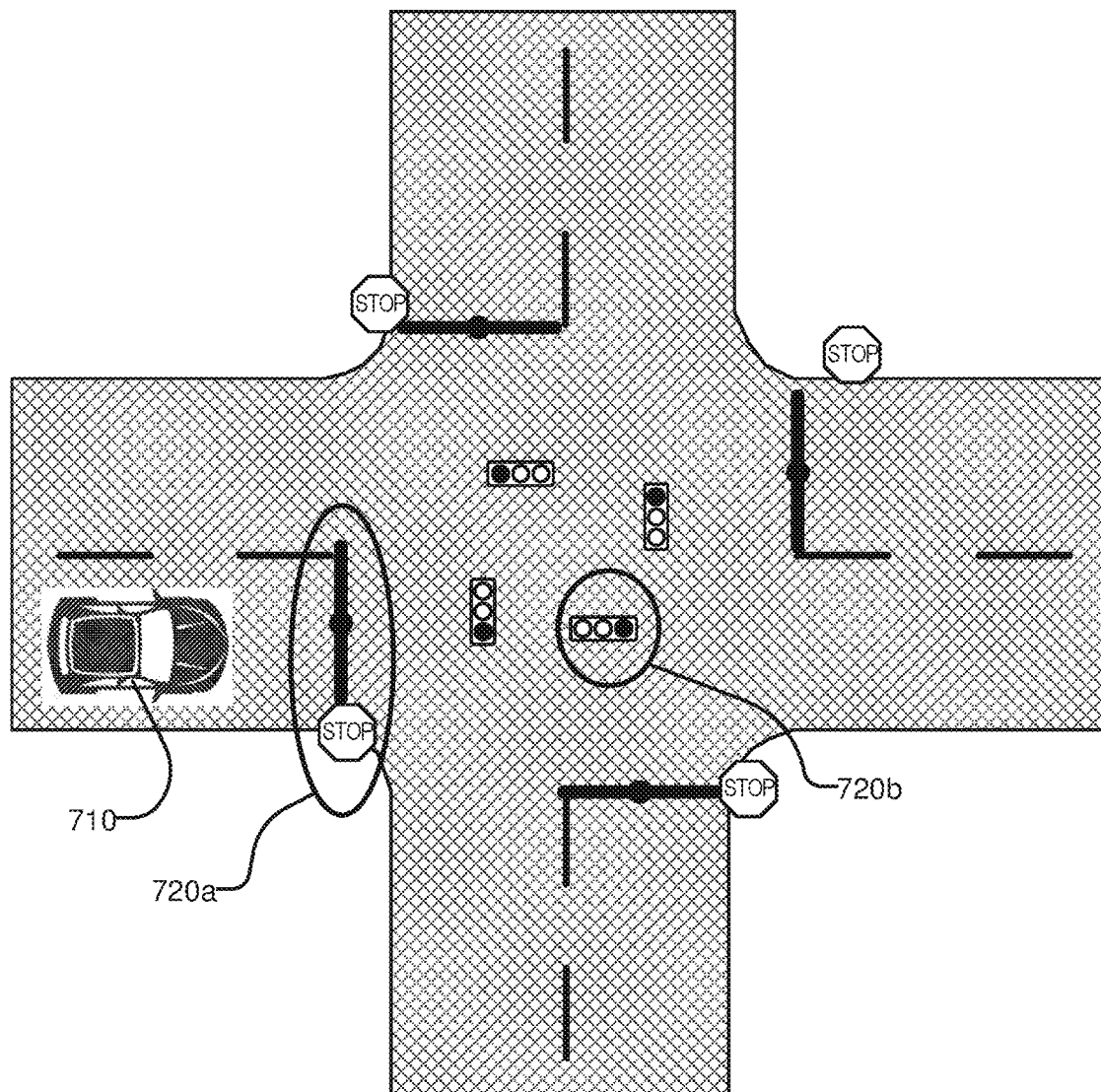
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
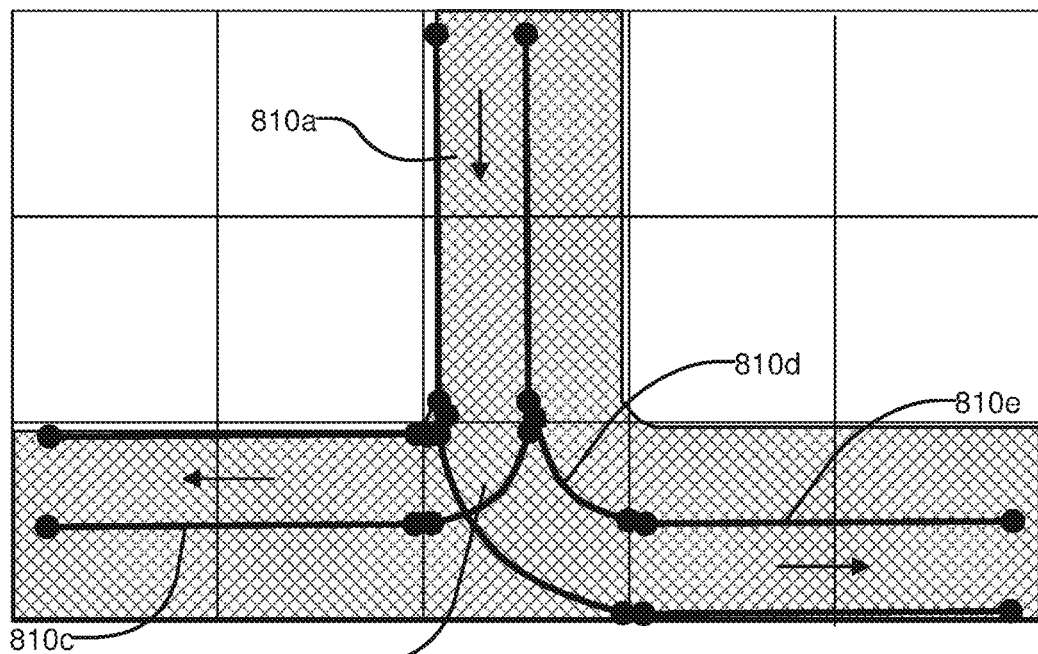
FIGS. 8A-8B illustrates example lane elements and relationships between lane elements in an HD map.
Figure 8B:
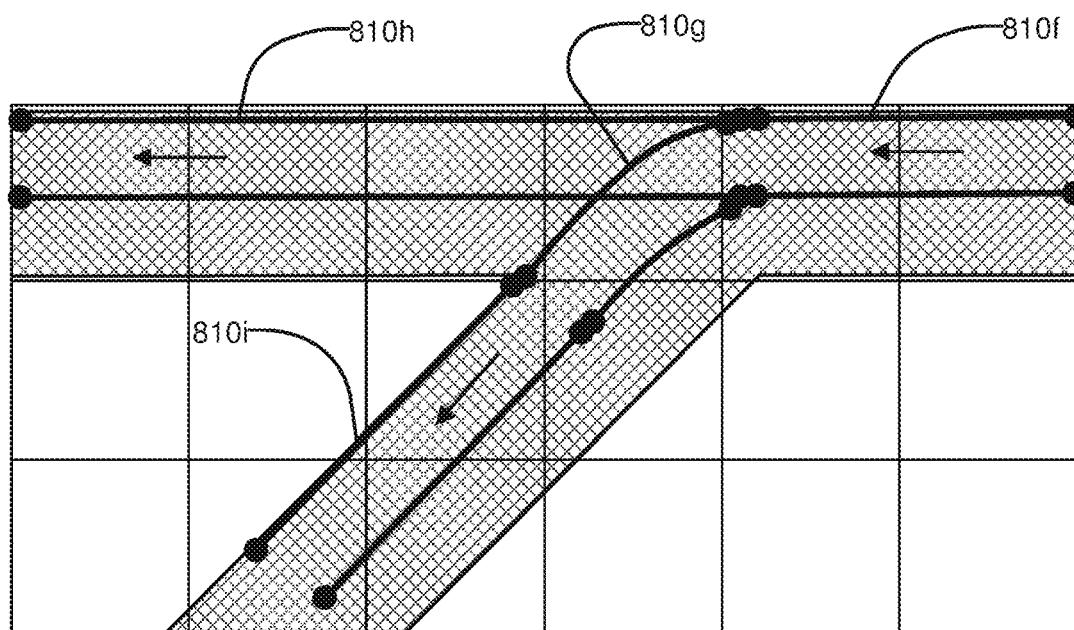

FIGS. 8A-B illustrate lane elements and relations between lane elements in an HD map. FIG. 8A illustrates an example of a T-junction in a road illustrating a lane element 810a that may be connected to lane element 810c via a turn lane 810b and is connected to lane 810e via a turn lane 810d. FIG. 8B illustrates an example of a Y-junction in a road illustrating label 810f connected to lane 810h directly and connected to lane 810i via lane 810g. The HD map system 100 may determine a route from a source location to a destination location as a sequence of connected lane elements that can be traversed to reach from the source location to the destination location.

Nearest Neighbor Search

In some embodiments, a system may perform a nearest neighbor search using an octree representation of a point cloud. For example, a nearest neighbor query may receive a point and a search radius (for example, a 40 cm radius or a 50 cm radius) as input and may identify points near the input point that are within the search radius. Neighbors that are at a distance greater than the input radius may be ignored and not returned as a result. The nearest neighbor search may be performed for localization, for example, for determining the pose of a vehicle. The nearest neighbor search may be performed by an ICP process.

In some embodiments, a system may store an octree representation in memory for processing of requests. In some embodiments, the data corresponding to nodes of the octree may be stored as a linear byte array. In some embodiments, the order of nodes in the linear array may be a depth first search order of traversal of the octree. Accordingly, if the system traverses the linear array in the order in which the nodes are stored, the system may encounter the nodes in the depth first search order in the octree. Each byte may correspond to a node of the octree, and the system may store bits indicating whether a child node is present (e.g., bit[i]=0 may imply that the ith child is absent and bit[i]=1 may imply that the ith child is present, where i=0 . . . 7 for the eight child nodes of each internal node of the octree).

In some embodiments, the system may store auxiliary information in the octree structure to be able to perform a nearest neighbor search by skipping subtrees if a neighboring point is determined not to be present within a subtree. Accordingly, at a particular level, the octree data structure may store links for a node Nx that allow the system to directly access a neighbor node Ny at the same level as the node Nx although the nodes are stored in depth first order. Accordingly, while searching for a point P, if the system reaches node Nx and determines that point P is not within the subtree rooted at node Nx, the system may skip the entire subtree below Nx and directly follow the link to reach node Ny. Since each node Nx may determine the coordinates of the cube represented by the subtree rooted at the node Nx, the system may determine whether any point is within the cube based on the coordinates without having to traverse the entire subtree below the node Nx. If the system determines that the point is within the subcube rooted at the node Nx, the system may continue the depth first traversal of the subtree rooted at node Nx. If the system determines that the point is not located within the cube represented by node Nx, the system may follow the link to the neighboring node Ny and may skip the traversal of the subtree below node Nx.

A link to a node Ny stored at node Nx may be the index of the node Ny. Alternatively, the link to node Ny stored at node Nx may be an offset value that, when added to the index of node Nx, gives the index of the node Ny. An offset may be likely to be smaller than the absolute value of index for each node and therefore may occupy less storage. These links may be created once and stored in a data structure. After that, the links may make nearest neighbor search queries faster by allowing efficient access to neighboring nodes. For example, a link that takes one byte of storage may skip subtrees that have 256 nodes. Therefore, if the sibling links are stored at two levels above the leaf nodes, a byte may be sufficient to store the sibling links. Also the first child of a node N1 may always be the node that immediately follows that node N1. Therefore, the system may not need to store a link to the first child and may obtain the first child by just advancing to the next node in the linear array representation of the octree.

In some embodiments, the nearest neighbor search may be a recursive procedure. For example, search_space may be a structure that specifies the query point and the search range for the nearest neighbor search, as follows:

nearest_neighbor_search(OctreeNode Nx, search_space)
1. determine based on coordinates of cube C corresponding to node Nx whether the search_space overlaps the cube C;
2. if node Nx is a leaf node, mark the leaf node Nx as overlapping the search_space;
3. if (search_space does not overlap cube C) identify sibling node Ny by following neighbor link of Nx (that skips the subtree rooted at Nx in the linear representation of the octree) and perform nearest_neighbor_search(Ny, search_space)
4. if (search_space overlaps cube C) identify child node Nz (if any) of node Nx by identifying child node Nz in linear array representation of octree and perform nearest_neighbor_search(Nz, search_space)
5. identify the nearest neighbor point within the leaf nodes marked as overlapping the search space;
6. return the identified nearest neighbor point.

In some embodiments, the online HD map system 110 may receive request from a vehicle computing system 120 for an HD map of a region and may provide a compressed representation of the region based on an octree to the vehicle computing system 120. The vehicle computing system 120 may download the compressed representation of the region based on the octree from the online HD map system 110. The vehicle computing system 120 may use the compressed representation of the region based on the octree for performing a nearest neighbor search. Accordingly, nearest neighbor searches may be performed directly on the compressed version without having to decompress it to recreate the 3D point cloud. The compressed representation of the region based on the octree may therefore be efficient for transmission and storage.

HD Map Compression

In some embodiments, a system may store a large, high resolution point cloud with associated per-point metadata efficiently. The efficiency of storing the 3D X,Y,Z coordinate data may be better than octree implementations.

In some embodiments, the system may use an octree to represent the X,Y,Z coordinates but define the precision and resolution such that all points are represented at the same level in the octree. With these constraints the system may implement a very efficient encoding which can very quickly be iterated over with minimal memory use.

In some embodiments, the system may store and compress the associated per-point attribute data (e.g., color, intensity, normals, Boolean category values) separately (per metadata type) as it may be more efficiently stored separately than trying to encode it directly in the octree. The system may separate the metadata by type results, and thereby may achieve better compression performance using standard compression algorithms. The system may enforce that the metadata is ordered in the same order as the octree traversal of the X,Y,Z point coordinates. This may provide a very efficient format for communicating a highly detailed 3D data across limited or costly network connections. Also, these techniques may allow the system to store a substantial amount of this data on disk.

In some embodiments, another variation may be to facilitate sub-octree fetches efficiently without doing much or any decoding of the file, which may be accomplished in multiple ways.

In some embodiments, the system may store point-attributes separately in same-type buffers which are relatively more compressible, with voxel-coordinates being pre-processed (domain/pre-compressed) using an octree-node byte-stream, and with the system storing and representing only the data that is needed for localization.

In some embodiments, an OMap-node may effectively present a quantized 3D point in a local-sector (OMap-file). Each node/point may have a number of point-attributes (e.g. XYZ, color, intensity, normal, etc.). Some embodiments include a storage-format for a stream of OMap-nodes. The node-stream may include all nodes as present in a local-sector/OMap, or, subsections thereof (e.g., a $2^N \times 2^N$ subdivisions of the x/y-extent of the local-sector/OMap). The OMap-nodes may be turned into a collection of compressed binary buffers for storage in a database. Due to their different properties (e.g., statistical and otherwise), different types of such data like XYZ or normals may be best compressed separately to achieve maximum compression, rather than storing all per-point data contiguously. For example, a binary per-point property that is zero for the majority of points may compress to less than 1 bit/point, if stored in a designated, contiguous buffer. However, when interleaved with other per-point data, it may always require 1 bit/point. Treating/storing the point-attributes separately may also allow for domain-specific pre-processing, which usually implies some data-specific compression (e.g. using indices and LUT for normals, octree-node byte-stream for voxel-coordinates, etc.), and it may be more efficient to obtain selected point-attributes (e.g., subsets of attributes).

In some embodiments, the point-attributes may include the following:

| Data Type | Raw Size in Bits |
| --- | --- |
| XYZ | 96 for float[3] or 48 for voxel coordinates or 2-30 for octree-node byte-stream |
| Intensity | 8 |
| Color | 24 for RGB or 16 with RGB565 or 8 using a palette/LUT |
| Edge Score | 1 byte (for edge localization) |
| Is Ground | 1 |
| Ground Misalignment Probability | 8 (for QA) |
| Normal | 96 for float[3] or 24 for 8-Bit fixed point integer per x/y/z or 8-16 Bits using an index and LUT |
| Is Hardscape | 1 (0 - thick veg., 1- smooth surface) |

Some embodiments may include creating compressed, binary buffers for point-attribute data. For example, a node-stream may be split according to the contained point-attributes, resulting in vectors of same-type attributes. The node's voxel-coordinates may be handled slightly differently. Some point-attributes may require additional pre-processing (e.g. normals may be converted to normal-indices that refer to quantized normals evenly distributed on a unit-sphere). Subsequently these vectors may be compressed using some generic compression algorithm, producing one compressed, binary buffer per point-attribute. In some embodiments, the storage of the voxel-coordinates may imply a specific, deterministic order for the points. Thus, as part of the node-compression, all other attributes may be re-ordered to comply with this ordering.

With regard to the structure of binary buffers for point-attribute data (e.g., a byte-stream), the binary-buffer-header may be immediately followed by the binary data. The header and binary data together may self-contained in the sense that they carry all the necessary information to decompress/decode the respective point-attribute. The Compression-Type may store the type of generic compression that was applied. The Data-Type may encode both the semantics of a given point-attribute as well as the type of data that results from the generic decompression.

In some embodiments, some point-attributes require additional processing (e.g., some embodiments represent normals using three single precision floating point numbers as more commonly required in algorithms that use normals). POINTS_* may refer to the node's voxel-coordinates, which may be stored in an octree-node byte-stream. In addition the header may store:

1. The size in bytes of the uncompressed data. If compression_type is UNCOMPRESSED, it may be the same as the size of the binary buffer. Otherwise this size may be used to decompress the data with known uncompressed/decoded size, which is generally faster.

2. The number of bytes for the binary data. If the data was not compressed, this size may be the same as for the uncompressed data.

3. Point-Cloud-Storage_octree-Header: This field may be present if the binary buffer has data-type POINTS_*.

With regard to decompressing binary buffers to retrieve point-attributes, given a binary buffer for a specific point-attribute, the first step may be to apply the generic decompression (if any) as specified in the binary-buffer-header. Afterwards some point-attributes (e.g. intensity, is-ground-flag, etc.) may be readily present. Others may require post-processing to obtain the actual data. In some embodiments, this may apply only to the voxel-coordinates, however, in some embodiments, colors and normals may also require additional processing.

With regard to 3D point compression using octrees, a premise may be that the 3D OMAP-nodes/points may be discretized to 3D voxel/grid positions (e.g., with 800 m/$2^{16}$ resolution at 800×800×800 meters). In some embodiments, the voxel-coordinates for all nodes/points in a given node-stream may be stored in a single octree. Some embodiments treat ground and non-ground points separately. This separation may also provide storage savings when applied to other point-attributes like color, intensity, normals, etc. In particular, the data related to ground-points may compress better, because several of the attributes for ground-points may often be very similar (e.g. normal, intensity). Some additional savings may be achieved by creating octrees that exactly fit the extent of the data.

In some embodiments, since the system encodes octree data at a fixed level of the octree and only uses the leaf address of each occupied voxel, this may simplify how the system can efficiently store octree data. For example, the system may build an octree from points. The system may store the intermediate nodes in the octree with 1 byte per node. Each bit may refer to one of the eight children, and may stores whether a given child-node exists (e.g., a (1) if exists, or a (0) if not). Leaf-nodes may not be stored explicitly, since the system may be representing all leaves at a predetermined level. The level of the node above may effectively carry this information using one bit per leaf. Each leaf may refer to a 3D point. The compression algorithm may return the order of the stored points in relation to the provided points such that additional data per point may be stored in the same order.

In some embodiments, the lower compression-bound may be about 1.15 bits/point for the case where the tree is fully populated (e.g., all grid-cells at the lowest level are present). The other "extreme" case may be given by points that are randomly distributed across the overall volume, which may give about 53 bits/point. The worst case of storing just a single point requiring as many bytes as there are levels in the octree may be 13 bits/point for the current OMap settings as mentioned above. However, the actual data may be expected to be structured and locally dense. For example, the resulting storage-size may be about 3.5 bits/point for a synthetic test-case, where points are sampled from a number of random planar patches within the overall volume. For a set of representative local-sectors/OMaps, the average storage size may be about 3.6 bits/point, including generic compression. Storing 20M points may require 5-10 MB.

With regard to the octree-based storage of the 3D voxel-coordinates, for rendering, localization, and landmark-automation, the system may retrieve all points for/below a certain octant (e.g., for cubes/tiles of ½N of the overall volume). To this end, the system may create (e.g., in RAM) a 2N×2N×2N lookup-table (or dense grid) that stores the byte-stream positions of the root-nodes of the respective cubes along with the necessary information to traverse the tree directly from there. For fine-grained resolutions, the system may use a spatial hashmap, rather than a dense grid, to store the lookup information.

In some embodiments, the system may store the whole octree in depth-first order, which implies that creating lookup-tables, as mentioned above, may require the traversal of most if not all of the byte-stream. In some embodiments, the system may write the first N levels in a breadth-first order, and subsequent levels in depth-first order. This may allow the system to create the aforementioned table for the given resolution N much faster, since only a small portion of the byte-stream may need to be traversed. N may be the coarsest required resolution, because retrieving all points for some (larger) octant above level N may be less efficient.

In some embodiments, the vast majority of the 3D related storage may be attributed to non-ground points. Some embodiments may store data describing tree-tops separately, either at a coarser resolution or not at all, if the data does not benefit localization. Accordingly, the system may classify points to determine their usefulness for localization and may store the point only if it is useful for localization. In other words, the system may not store points that are not relevant for localization.

Creating an Octree-Based HD Map from Point Cloud Data

In some embodiments, an occupancy map (OMap), also known as a localization map, may be used by a self-driving vehicle to localize and to reference for road planning. Some functions of an OMap may include localization, OMap differencing, and navigable surfaces calculation. The system may store the OMap as a 3D probabilistic octree-based mapping model. For example, some features may include:

1. Given a point (x, y, z), find the nearest occupied node efficiently (nearest neighbor search algorithm).
2. In some embodiments, one local sector may be processed on a single machine within 30 minutes.
3. The OMap may be be exported to files for local sectors.
4. A previous local sector OMap may be be imported to aggregate with new point cloud data.

In some embodiments, "localization" may be a problem of given a map using sensors to decide "where am I?". The OMap may be used to help self-driving vehicles to localize (e.g., within 5 cm of accuracy). Thus, the OMap may also be known as a localization map. In some embodiments, the localization process may include the following:

1. A self-driving vehicle may include onboard sensors (e.g., Velodyne LIDAR sensor, cameras, GPS/IMU, etc.). The onboard sensors may continuously collect data that may be used to localize the vehicle at a high frequency (e.g., 10 Hz).
2. The OMap files may be pre-loaded on the vehicle. The OMap files may generally cover a whole city, which may cover the autonomous driving area.
3. Based on the GPS/Inertial Measurement Unit (IMU), the coarse location (e.g., with accuracy of 5 m or more) may be known. Thus the local sector (e.g., QuadtreeKey at level 16) maybe be calculated. The OMap file for that local sector may be loaded.
4. A vehicle may perform localization by doing Iterative Closest Point (ICP) between the point cloud from the LIDAR and the loaded OMap. The LatLng (latitude and longitude) coordinates returned by Localize( ) may be much more accurate than the GPS location.

In some embodiments, the system may store an octree, which may be a hierarchical data structure for spatial subdivision in 3D. Each node in an octree may represent the space contained in a cubic volume, with may also be known as a voxel. The system may use the octree data structure to implement the OMap in a local sector. The system may use the octree as a spatial index to identify a point's location and may use the octree to identify node neighbors. Accordingly, an octree may allow a nearest neighbor search to be performed relatively quickly when used for ICP.

Figure 14:
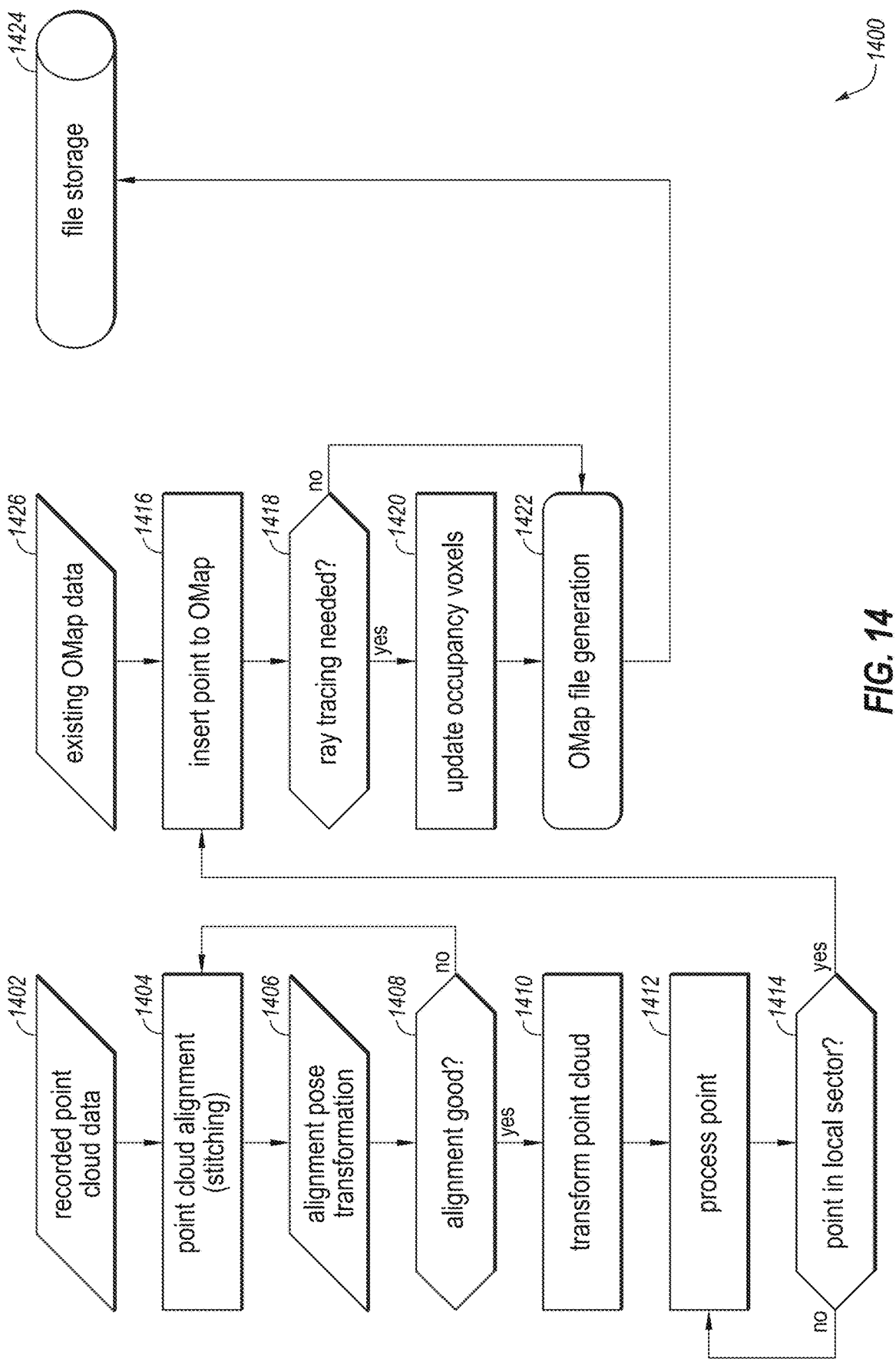
FIG. 14 illustrates a flow chart of an example method for creating an octree-based HD map from point cloud data.

FIG. 14 illustrates a flow chart of an example method 1400 for creating an octree-based HD map from point cloud data. The method 1400 may be performed by any suitable system, apparatus, or device. For example, one or more elements of the HD map system 100 of FIG. 1 may be configured to perform one or more of the operations of the method 1400. Additionally or alternatively, the computer system 1800 of FIG. 18 may be configured to perform one or more of the operations associated with the method 1400. Although illustrated with discrete blocks, the actions and operations associated with one or more of the blocks of the method 1400 may be divided into additional blocks, combined into fewer blocks, or eliminated, depending on the particular implementation.

The method 1400 may begin with recorded point cloud data at 1402. Then point cloud alignment (stitching) may be performed at 1404, followed by alignment pose transformation at 1406. If this alignment is not sufficiently good at 1408, the method 1400 may return to 1404. Otherwise, the method 1400 may continue to transform the point cloud at 1410 and process a point at 1412. If the point is not in the local sector at 1414, the method 1400 may return to 1412.

Otherwise, the method 1400 may continue to insert the point to an OMap at 1416. If ray tracing is needed at 1418, the method 1400 may continue to update occupancy voxels 1420. Otherwise, the method 1400 may proceed directly to OMap file generation at 1422 and file storage at 1424. The method 1400 may further include extracting existing OMap data at 1426 from the file storage 1424 prior to the inserting at 1416.

Similar to the QuadtreeKey implementation, a class OctreeKey may be used. In each node, its children may be labeled 0 to 7 (e.g., where a cube is divided evenly into 8 sub-cubes, the bottom 4 cubes may be numbered 0=northwest bottom cube, 1=northeast bottom cube, 2=southwest bottom cube, and 3=southeast bottom cube, and the upper four cubes may be numbered 4=northwest top cube, 5=northeast top cube, 6=southwest top cube, and 7=southeast top cube). In some embodiments, the OctreeKey class may store a single unsigned 64 bit integer to encode the key string ([0 . . . 7]). The first few bits may store the level information. The rest may store the pos code. This may be represented as $Id\_=[level][pos]$.

Each local sector may be Quadtree level 16 or 15 and the Octree may continue to subdivide the local sector. Assuming the local sector size is 500 m, the resolution of each level may be 0=500 m, 1=250 m, . . . , 10=0.488 m, 11=0.244 m, . . . , 13=0.061 m, 14=0.03 m, etc. In some embodiments, the resolution may be sufficiently high at level 14.

With regard to a height of a level 0 local sector octree node, the height of a local sector octree node may need to be determined. The height may need to be large enough to cover the highest and lowest features in the node. For example, the level 0 node may be a cube with dimension 800 m×800 m×800 m. This may guarantee that all heights in a local sector will be covered (e.g., there may be local sectors which have height difference >800 m in the local sector, but they may not be in the interested mapping regions). The level 0 node size may be bigger than a local sector, but their center point may be the same. With the center as the origin point, any points with elevation smaller than local sector center may be in children node 0, 1, 2, 3, while points higher than local sector center may be in children node 4, 5, 6, 7. Each local sector may have a different z origin sea level altitude.

In some embodiments, an ingestion process may run on a single worker, and may include:

1. Load previous local sector OMap file if there is any. This is for incremental ingestion purposes.

2. For each point, find the empty nodes by using a ray tracing algorithm. Update the empty node "occupied probability" and update the end point's occupied probability.

3. After all points are ingested, aggregate the results for each node. The aggregation may result in one point (payload) or two points in an occupied node. There may be rare cases with unusual shape structures, but two common cases are: 1) the feature has one surface that was detected by the sensors (e.g., a wall), and 2) the feature has two surfaces (e.g., a STOP sign).

Nearest Neighbor Search with Octree Byte Streams

In some embodiments, finding the closest map point to a given query-point from a current LIDAR scan may be an important and frequent operation in LIDAR-based localization, and may account for a majority (e.g., 70-80%) of the processing time. The system may store a 3D HD map data as dense point clouds for planar subdivisions of the Earth's surface. In some embodiments, the points may be stored as 50×50 meter tiles, and they may be compressed using octree byte streams. On a vehicle, 3D tile data may be decompressed to obtain 3D points, and the points may then be processed into kd-tree, which may be spatial data structures that provide very fast nearest neighbor queries. The full decompression and kd-tree generation may take significant processing time, and thus the kd-tree may be generated before use and stored on the vehicle. The size of these kd-tree may be larger than (e.g., more than 20 times larger than) the compressed point cloud data. Therefore, it may be desirable to perform the nearest neighbor search directly on the octree byte stream. The additional data needed to perform this search may be expected to be significantly smaller than kd-tree, and it may be possible to compute this extra data on-the-fly (e.g., when the map tiles are used for localization).

In some embodiments, a system may compute auxiliary data that enables a relatively fast nearest neighbor search. The octree byte stream may encode a spatial graph that may be readily used for this search. However, it may be stored linearly without embedded child addresses, which may mean that the data referring to a child node cannot always be accessed directly.

In some embodiments, given a query-point and a maximum search-range, the system may find the closest point subject to Euclidean distance. A sub-tree may be inspected if the sphere or axis aligned box defined by the query-point and search-range overlap with a given octant, otherwise the system may skip the sub-tree (e.g., all nodes below a given node). The octree byte-stream may store the nodes in depth-first order to make this computation efficient. Some embodiments may use an additional index storing the number of nodes below a given node. In some embodiments, all non-empty children for a given node may be pushed onto a queue with their octant geometry. For the search, the system may first check whether the query-box overlaps with the given node. If there is no overlap, then the system may skip the entire subtree represented by the given node, which may mean that both the octree-byte-stream and the index-buffer are forwarded by the number stored in the index-buffer. Some embodiments may use relative indexing. Some embodiments may compute direct indices to child-nodes and store them for each internal node. This direct indexing may not be practical in the form of a separate index-table, but rather may be interleaved with the octree-byte-stream. Interleaved indexing may provide opportunities for significant storage savings, and may also be applied to the relative indexing. Some of these storage savings at the lower levels may improve performance due to better caching behavior. The system may generate the octant geometry during the octree traversal, because the octree-byte-stream may only store the graph topology. These and similar problems relating to octree traversal and nearest neighbor search may be solved efficiently by means of Morton Codes. Some embodiments may use an optimization that stores a Hashmap to Lower Level of Octree, which may save traversing the upper octree-levels. This technique may be deployed in addition to all of the techniques discussed above. The potential time-savings may depend on the number and traversal-cost of skipped octree-levels. Finding the closest child-node within a leaf-node-parent given the query-point may be accelerated by means of a Lookup Table for Leaf Node Nearest Neighbor.

Figure 15:
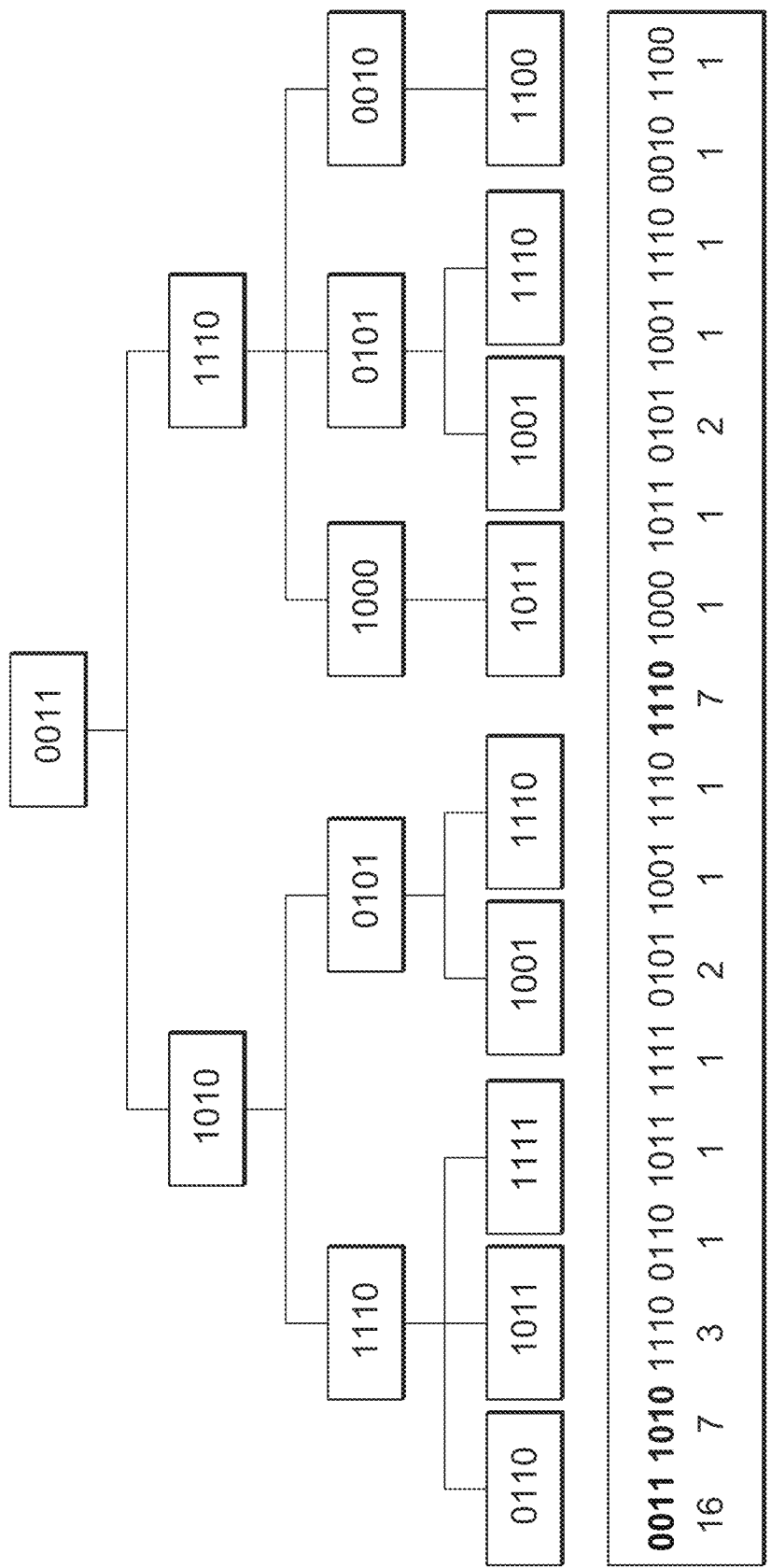
FIG. 15 illustrates an octree employing relative indexing that uses a separate index-table with one index per internal node.

FIG. 15 illustrates an octree employing relative indexing that uses a separate index-table with one index per internal node. In particular, the lowest level in the octree illustrated in FIG. 15 are leaf-node-parents. Each 1 in a leaf-node-parent encodes a 3D point. Thus, the simple tree of FIG. 15 encodes 24 points via 17 internal nodes. In some embodiments, the synchronized traversal of the node-byte-stream and the index-table may be trivial because they have a 1-to-1 relationship (e.g., if N nodes are skipped in the octree-byte-stream then N indices are skipped in the index-table).

a node higher up in the hierarchy. In the latter case, the parent-index stack may be unrolled (e.g., upwards updated) until the new parent-index is reached. The following table illustrates the process of creating the index buffer for the above graph:

| Current Node, Parent Node | Child Node Stack | Parent Index Stack | Index Updates | Index Buffer: Number of Child Nodes i⇒j: buffer[j] = buffer[i] + 1 |
|---|---|---|---|---|
| 1 | 2, 14 | | | 0 |
| 2, 1 | 3, 9, 14 | 1 | | 0, 0 |
| 3, 2 | 4, 6, 9, 14 | 2, 1 | | 0, 0, 0 |
| 4, 3 | 5, 6, 9, 14 | 3, 2, 1 | | 0, 0, 0, 0 |
| 5, 4 | 6, 9, 14 | 4, 3, 2, 1 | 5⇒4 | 0, 0, 0, 1, 0 |
| 6, 3 | 7, 8, 9, 14 | 3, 2, 1 | 4⇒3 | 0, 0, 2, 1, 0, 0 |
| 7, 6 | 8, 9, 14 | 6, 3, 2, 1 | 7⇒6 | 0, 0, 2, 1, 0, 1, 0 |
| 8, 6 | 9, 14 | 6, 3, 2, 1 | 8⇒6 | 0, 0, 2, 1, 0, 2, 0, 0 |
| 9, 2 | 10, 14 | 3, 2, 1 | 6⇒3 | 0, 0, 5, 1, 0, 2, 0, 0, 0 |
| | | 2, 1 | 3⇒2 | 0, 6, 5, 1, 0, 2, 0, 0, 0 |
| 10, 9 | 11, 12, 13, 14 | 9, 2, 1 | | 0, 6, 5, 1, 0, 2, 0, 0, 0, 0 |
| 11, 10 | 12, 13, 14 | 10, 9, 2, 1 | 11⇒10 | 0, 6, 5, 1, 0, 2, 0, 0, 0, 1, 0 |
| 12, 10 | 13, 14 | 10, 9, 2, 1 | 12⇒10 | 0, 6, 5, 1, 0, 2, 0, 0, 0, 2, 0, 0 |
| 13, 10 | 14 | 10, 9, 2, 1 | 13⇒10 | 0, 6, 5, 1, 0, 2, 0, 0, 0, 3, 0, 0, 0 |
| 14, 1 | 15 | 9, 2, 1 | 10⇒9 | 0, 6, 5, 1, 0, 2, 0, 0, 4, 3, 0, 0, 0, 0 |
| | | 2, 1 | 9⇒2 | 0, 11, 5, 1, 0, 2, 0, 0, 4, 3, 0, 0, 0, 0 |
| | | 1 | 2⇒1 | 12, 11, 5, 1, 0, 2, 0, 0, 4, 3, 0, 0, 0, 0 |
| 15, 14 | 16, 19 | 14, 1 | | 12, 11, 5, 1, 0, 2, 0, 0, 4, 3, 0, 0, 0, 0, 0 |
| 16, 15 | 17, 18, 19 | 15, 14, 1 | | 12, 11, 5, 1, 0, 2, 0, 0, 4, 3, 0, 0, 0, 0, 0, 0 |
| 17, 16 | 18, 19 | 16, 15, 14, 1 | 17⇒16 | 12, 11, 5, 1, 0, 2, 0, 0, 4, 3, 0, 0, 0, 0, 0, 1, 0 |
| 18, 16 | 19 | 16, 15, 14, 1 | 8⇒16 | 12, 11, 5, 1, 0, 2, 0, 0, 4, 3, 0, 0, 0, 0, 0, 2, 0, 0 |
| 9, 15 | 20, 21 | 15, 14, 1 | 16⇒15 | 12, 11, 5, 1, 0, 2, 0, 0, 4, 3, 0, 0, 0, 0, 3, 2, 0, 0, 0 |
| 20, 19 | 21 | 19, 15, 14, 1 | 20⇒19 | 12, 11, 5, 1, 0, 2, 0, 0, 4, 3, 0, 0, 0, 0, 3, 2, 0, 0, 1, 0 |
| 21, 19 | | 19, 15, 14, 1 | 21⇒19 | 12, 11, 5, 1, 0, 2, 0, 0, 4, 3, 0, 0, 0, 0, 3, 2, 0, 0, 2, 0, 0 |
| | | 15, 14, 1 | 19⇒15 | 12, 11, 5, 1, 0, 2, 0, 0, 4, 3, 0, 0, 0, 0, 6, 2, 0, 0, 2, 0, 0 |
| | | 14, 1 | 15⇒14 | 12, 11, 5, 1, 0, 2, 0, 0, 4, 3, 0, 0, 0, 7, 6, 2, 0, 0, 2, 0, 0 |
| | | 1 | 14⇒1 | 20, 11, 5, 1, 0, 2, 0, 0, 4, 3, 0, 0, 0, 7, 6, 2, 0, 0, 2, 0, 0 |

In some embodiments, relative indexing may require 4 bytes per internal node. For practically relevant use cases the number of internal nodes may be smaller than the number of points. Thus, an upper bound for the index-storage may be 4 bytes/point. The speed of building the index may be comparable to traversing the octree without inspecting leaf-node-parents, which may typically run faster than 100 million points/sec. In some embodiments, building the index for octree-byte-streams of 1-50 Million points may be expected to take somewhere between 10-500 milliseconds.

Figure 16:
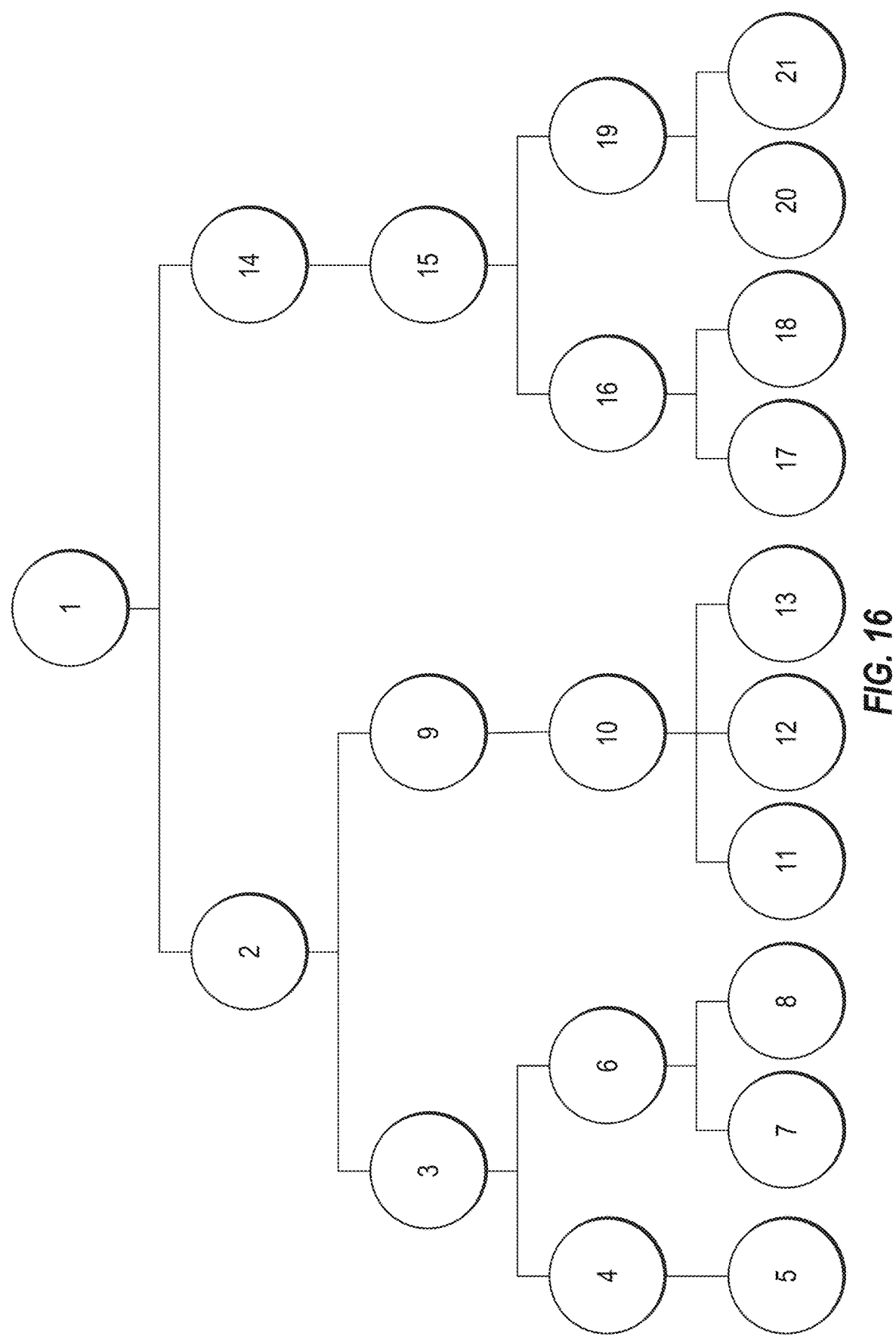
FIG. 16 illustrates a simple octree structure.

With regard to creating the relative index, FIG. 16 illustrates a simple octree structure. The nodes in the octree of FIG. 16 are enumerated in the order that they would appear in an octree-byte-stream (e.g., in depth-first order). Each internal node is represented by one byte in the octree-byte-stream, which encodes the presence/absence of up to eight child nodes. However, the notion of octree geometry was omitted from the graph.

The relative index may contain for each internal node the number of bytes below that node, which may be equivalent to the number of child-nodes below that node. In the compact octree-byte-stream, the leaf-nodes are actually leaf-node-parents. Leaf-node-parents have no bytes below them, which is represented in the index-buffer by zeros. Create the relative index may involve avoiding unpacking the points and traversing the octree-byte-stream only once.

Some embodiments associate each child-node with its parent-index and have a parent-index stack. The parent-index may point to the entry in the index-buffer that refers to the respective parent-node. The parent-node index may be updated whenever the current child-node is a leaf-node-parent or the parent-index of the next child-node references With respect to direct indexing, some embodiments use direct indexing for accessing octree nodes (e.g., each internal node stores direct indices to its child-nodes). In these embodiments, the node-byte-stream and the index-table no longer align such that skipping N node-bytes does not imply skipping N indices. This may be simply because the octree-byte-stream stores one byte per node, whereas the direct index stores multiple indices for the same node. Consequently, if the direct index was created as a separate table, then another index may be employed that effectively stores for each node the index to its child-indices. This may require more storage and could possibly slow down traversal. Therefore, some embodiments implement direct indexing in an interleaved fashion (e.g., the child-indices are inserted into the octree-byte-stream such that each node-byte is followed by the direct indices to its existing child-nodes). The storage requirements for the indices are the same as for interleaved relative indexing, which in some embodiments is estimated to be less than 2 bytes per point, since no indices need to be stored at leaf-node-parents and their parents (see also the discussion of interleaved and space-saving indexing below). The index creation times may be as fast as, or faster than, for relative indexing.

With regard to direct-relative indexing, in some embodiments, similar to direct indexing, indices may be stored with parent nodes to point to each of the existing child-nodes. However, here the indices are relative to the parent-node index. The motivation may be simply to save storage space, using 3 instead of 4 bytes per index due to the relative indices having a smaller range. This may not improve query performance.

With regard to interleaved and space-saving indexing, this approach may be combined with both the relative and direct indexing. Direct indexing maybe implemented as interleaved. Generally, interleaving may be preferred to creating separate index tables because it may provide better performance due to better data throughput (e.g., caching behavior), and may imply significant space savings of at least 50%, and possibly as much as 75%. This means that the additional storage for indexing could be as little as 1 byte/point as compared to >12 bytes/point for kd-trees.

Some embodiments may result in observable space saving. For example, in some embodiments, no indices may be needed for leaf-node-parents (Level-0 nodes). These nodes are at the lowest level of the octree byte stream, and as such they may always be contiguous in the byte stream. The bits of the leaf-node-parents may be traversed in order, and the increment to get to the next sibling node may be simply one. Regarding relative indexing, the index for leaf-node-parents may always be zero, which may imply the minimum increment of one. In another example, no indices may be needed for parents of leaf-node-parents (Level-1 nodes). Each of their children (e.g., leaf-node-parents) may occupy exactly 1 byte. The number of children is the number of bits in the node-byte. Thus, the step size in bytes necessary to skip parents of leaf-node-parents may be readily computed from the node-byte without storing any indices. In another example, for relative indexing only 1 byte may be needed for Level-2 and Level-3 nodes. This may be simply because the maximum number of nodes is less than 256 (e.g., below Level-2 nodes the maximum is 8×8=64, and below Level-3 it is 8×8×8=256). Thus, 1 byte may be sufficient to encode the actual number of nodes/bytes below Level-2/3 nodes.

With regard to interleaved direct indexing, combining direct indexing with interleaving and some of the space-saving techniques from above may outperform relative indexing. Following are additional details regarding the implementation of interleaved direct indexing. In some embodiments, no indices need to be stored for leaf-node-parents and their parents. For all other internal nodes, 4 byte integers may be used to store the child-node indices. However, no index needs to be stored for the first child node, as seen in the following illustration.

Example Parent-Node-Byte

| Child Index | 7 | 6 | 5 | 4 | 3 | 2 | 1 | 0 |
|---|---|---|---|---|---|---|---|---|
| Example Bits | 0 | 1 | 1 | 0 | 1 | 0 | 0 | 0 |
| Order of Child Subtrees in the node-byte-stream | | 1 | 2 | | 3 | | | |

High-Level view of the node-byte-stream following the parent-node.

| Parent node-byte | Subtree for child-node 6 | Subtree for child-node 5 | Subtree for child-node 3 | ... |
|---|---|---|---|---|

Node-byte-stream with interleaved child-indices.

| Parent node-byte | Index to subtree for child-node 5 | Index to subtree for child-node 3 | Subtree for child-node 6 | Subtree for child-node 5 | Subtree for child-node 3 |
|---|---|---|---|---|---|

For a parent node with N children, the index to the first child's subtree is: (N−1)*sizeof(index)

Creating the interleaved direct index may be relatively straightforward. As for the usual octree traversal, each child node may be pushed onto a stack along with an index to where the direct index for a given child is to be stored. When the child node is processed, the respective direct index may readily be inserted into the interleaved node-byte/index-stream. For the first child node this index-to-the-index may be set to zero, indicating that nothing may need to be done. Along with the current node index, a separate index may be maintained, which may account for the inserted direct indices. In some embodiments, no voxel-related geometry may be generated.

The actual search may involve the system counting the non-zero bits in a given node-byte, which may be simple and fast using the popcnt intrinsic. In addition, the non-zero bits may be enumerated from left to right as shown in the above table with the example parent-node-byte. This is to determine the order of the child-node subtrees, and can be done by a combination of shift and the popcnt intrinsic. Given the child_index and the node_byte, the number of non-zero bits left of the child-node-bit may be computed as: left_num_non_zero=popcnt(node_byte>>(child_index+1)). The index to the direct index for all but the first child-node follows may be computed as: child_node_subtree_index= (left_num_non_zero−1)*sizeof(index)+1. The subtree-index for the first child may be computed as described above, and nothing may need to be done if the parent-node only has one child.

With regard to a fast sphere-AABB overlap test, the overlap test between query-sphere and octant-box may be one of the largest time-cost factors in the octree nearest neighbor search. The query-sphere may be implied by the query-point and the maximum search radius as center $[s_x, s_y, s_z]$ and radius r. The axis-aligned box may be given by center $[b_x, b_y, b_z]$ and side-lengths $[b_{sx}, b_{sy}, b_{sz}]$. The octant-box may usually be a cube (i.e. the resolutions along x/y/z are the same, $b_{sx}=b_{sy}=b_{sz}$). The relative absolute sphere center $[s_x^{rel}, s_y^{rel}, s_z^{rel}]$ may be used to simplify the tests below. The term "absolute" may imply that the relative sphere center is flipped and mirrored to lie in the xyz-positive octant, which is valid due to the inherent symmetry of the problem: $s_x^{rel}=|s_x-b_x|$, $s_y^{rel}=|s_y-b_y|$, $s_z^{rel}=|s_z-b_z|$.

In some embodiments, a first test may determine whether the sphere center is inside the box as follows: $(s_x^{rel} \le b_x/2) \wedge (s_y^{rel} \le b_y/2) \wedge (s_z^{rel} \le b_z/2)$. In some embodiments, the test below implies this condition, and thus this test is not explicitly performed.

In some embodiments, a second text may determine whether the box-surface-point closest to the sphere-center is inside the sphere. If yes, then the distance between the sphere-center and the closest box-surface-point is smaller than the squared sphere-radius, and the sphere overlaps with the AABB. This may be performed by first finding the point on the box-surface that is closest to the sphere center and compute the squared distance $d^2$ between the sphere-center and the closest box-surface-point. The sphere overlaps with the axis-aligned box, if $d^2 < r^2$.

$$x_t=(s_x^{rel} \le b_x/2)?s_x^{rel}:b_x/2 \Rightarrow \Delta x = s_x^{rel}-x_t$$

$$y_t=(s_y^{rel} \le b_y/2)?s_y^{rel}:b_y/2 \Rightarrow \Delta y = s_y^{rel}-y_t \Rightarrow d^2 = \Delta x^2 + \Delta y^2 + \Delta z^2$$

$$z_t=(s_z^{rel} \le b_z/2)?s_z^{rel}:b_z/2 \Rightarrow \Delta z = s_z^{rel}-z_t$$

Note that $\Delta x$ may be either 0 or $(s_x^{rel}-b_x/2)$ subject to the condition $(s_x^{rel} \le b_x/2)$ as checked above, which implies that computing $x_t$ and $\Delta x$ may be combined as follows, similarly for y and z:

$$\Delta x=(s_x^{rel} \le b_x/2)?0:s_x^{rel}-b_x/2$$

$$\Delta y=(s_y^{rel} \le b_y/2)?0:s_y^{rel}-b_y/2 \Rightarrow d^2=\Delta x^2+\Delta y^2+\Delta z^2$$

$$\Delta z=(s_z^{rel} \le b_z/2)?0:s_z^{rel}-b_z/2$$

To avoid computing, squaring, and adding $\Delta x$, $\Delta y$, and $\Delta z$, if they are zero, this can be rewritten as follows:

$$d^2=0$$

$$\text{if}((s_x^{rel}>b_x/2)\{\Delta x=s_x^{rel}-b_x/2;d^2=d^2+\Delta x^2;\}$$

$$\text{if}((s_y^{rel}>b_y/2)\{\Delta y=s_y^{rel}-b_y/2;d^2=d^2+\Delta y^2;\}$$

$$\text{if}((s_z^{rel}>b_z/2)\{\Delta z=s_z^{rel}-b_z/2;d^2=d^2+\Delta z^2;\}$$

Alternatively, the following provides a branchless version of the above:

$$\Delta x=s_x^{rel}-b_x/2, \Delta y=s_y^{rel}-b_y/2, \Delta z=s_z^{rel}-b_z/2$$

$$dx2=\{0,\Delta x^2\}, dy2=\{0,\Delta y^2\}, dz2=\{0,\Delta z^2\}$$

$$d^2=dx2[s_x^{rel}>b_x/2]+dy2[s_y^{rel}>b_y/2]+dz[s_z^{rel}>b_z/2]$$

With regard to LUT (lookup table) for closest-first traversal of child-octants/nodes, the next-child-node-to-visit-LUT may be used to obtain the closest, non-empty child-node/octant according to a closest-first ordering and subject to a given parent-octant's node-byte and relative_query_index as described in the following. This may imply that the look-up comprises two steps. First, the relative_query_index may be used to obtain the ordering of child-nodes, which in turn gives a 256-entries/byte table that subject to the octant's node-byte returns the closest, non-empty child-node-octant. Thus, the outer table may be indexed via the relative_query_index, and the inner table may be indexed via the octant's node-byte.

With regard to defining the closest-first ordering, the parent octant may be split by six planes, namely the (x,y), (x,z), and (y,z) planes as well as 45 degree rotated versions of these, which divide the octant cube into 48 tetrahedrons, and each cube side into 8 triangles. The cube center, the tetrahedron center, and the respective cube side triangle center form a ray. The tetrahedron and triangle centers may be computed as the averages of their corner points. All points on the aforementioned ray further from the cube center than the tetrahedron center specify the same order of child-octant centers by means of proximity. Because of the symmetry, the distance to the Nth closest octant center is the same for all reference points. Using an octant cube with side-length 2, the distances in ascending order are listed below. It can be seen that the fourth and fifth closest octant center have the same distance to the reference points (e.g., their order is not uniquely defined): 1:0.552 2:0.986 3:1.280 4:1.518 5:1.518 6:1.724 7:1.907 8:2.074

In some embodiments, the reference points that imply the child-node ordering may be computed as the centers of the cube's surface triangles. In fact, only one such triangle center may need to be computed because due to symmetry all other 47 triangle centers follow via xyz-permutations and sign-flips. For example, an octant cube with side-length of two centered at [0, 0, 0] may have the triangle {[0, 0, 1], [0, 1, 1], [1, 1, 1]} with center [1/3, 2/3, 1] chosen. With respect to the C/C++ implementation, the xyz-coordinates of this triangle reference point may be intentionally constructed in ascending order such that std::next_permutation( ) properly iterates all six permutations.

With regard to a relative query index, the relative_query_index may follow from the octant's subdivision and may refer to the ordering of child-nodes/octants as described above. For example, the octant cube may be divided into 48 segments by six planes and the query-point may be assigned to one of the 48 segments by means of a one-byte-index, which may be computed as shown below. In some embodiments, the relative_query_index may use 6 bits, which implies a maximum of 64 bit-patterns. Only 48 distinct patterns may be used due to the octant's subdivision as described above however, and the bit patterns spread across the full range from 0 to 63.

$$\text{relative\_query\_point}=[dx,dy,dz]=\text{octant\_center}-\text{query\_point}$$

$$\text{relative\_query\_index}=((dx>0)<<5)|((dy>0)<<4)|((dz>0)<<3)|((abs(dx)>abs(dy))<<2)|((abs(dy)>abs(dz))<<1)|(abs(dx)>abs(dz))$$

With regard to a hashmap to lower level of tree (subtree-octant), in some embodiments, the system may create/use hashmaps that enable the system to jump directly to the root-node of the subtree at a given tree-level/depth (e.g., N=3, 4, 5, 6). Accordingly, the nearest neighbor search may proceed as follows:

1. The Morton code of the level N octant $O_M$ that the query-point falls in follows from the query-point Morton code $g_M$: $O_M = g_M >> 3 \cdot (N+1)$.

2. Check/traverse the octant from (1). This updates the search radius/box.

3. Find a neighbor octant that overlaps with the search box. Check/traverse it. In some embodiments, the system may not consider all 3×3×3=27 neighbors. Instead, the system may compute x/y/z ranges (e.g., a subrange of [−1, 1]), and create a list as suggested above, as going over all 27 neighbors to create that list may be too slow. Only neighbors in this range may need to be checked. However, the ranges may need to be updated after each octant traversal, because it may update the search radius/box.

4. Repeat 3 until no more octants need to be checked.

Some embodiments store references to non-empty neighbor-voxels at some tree-level. Further, instead of a hashmap, some embodiments may use dense voxel-grid with non-empty neighbor info.

With regard to lookup table (LUT) for leaf node nearest neighbor octree node, in some embodiments, for a given a leaf octree node and query octree node ID, the system may do two lookups to determine the octree node ID of the closest occupied point in the leaf octree node. Conceptually, the leaf octree node may contain an 8-bit value, LeafNode-Value, that determines the occupancy of the node. When doing a leaf node check, the system may search these bits in order that depends on the relative position of the query node to the leaf node octants. For each combination of relative position (quantized) and possible leaf node values, the system may compute the closest octree node id and store this result in a lookup table. The system may classify the query point based on its relation to the octree node, by quantizing the difference from the query node to the octant center. The system may quantize this by expanding the octant by 1 node in all directions. This gives a 4×4×4 cube with 64 nodes. For each of these nodes, the system may compute the ordering of the octant nodes in nearest octant first. Then the system may create a 64×256 LUT that maps the difference node and LeafNodeValue to a specific octree node id, SuperOctantNodeId, where a super octant is a 4×4×4 group of octants, where the inner 2×2×2 octants are the octree leaf node being searched.

In some embodiments, a query node id may be spatially relative to the leaf node being searched. The system may assume a fixed max search radius, and the system may create a LUT of SuperOctantNodeIds for each possible search position relative to the leaf node. For example, if the system has a max search radius of 50 cm and a resolution of 5 cm, the system may have a search diameter of 20 nodes (e.g., 21×21×21 LUT—9261 entries—with the query node as the center). In some embodiments, the system may make the coordinates of the relative position always positive by putting the query node in the center of the 21×21×21 cube of octree nodes. In some embodiments, this may be indexed by figuring out where the leaf node intersects the query node neighbor octree nodes by subtracting the query_node_id–leaf_node_id+kBottomLeftFrontPositionId=RelativeSearchPosition. In some embodiments, morton codes may be used, and SuperOctantNodeId kClosestSuperOctantIdForQuery[kRelativeSearchPositions]. Then the system may create a LUT that takes 2 indices (e.g., the closest SuperOctantNodeId (64) and the LeafNodeValue (256), giving a 16 k LUT), as follows OctreeNodeId kNearestOccupiedNodeId[kSuperOctantNodeIds][kLeafNodeValues]. Then, the system may use this LUT in the search, which may involve the value of the leaf octree node being searched and computing the node_id of the nearest node:

```
LeafNodeValue
    leaf_node_value=node.LeafNodeValue;

RelativeSearchPosition relative_position(query_no-
    de_id,leaf_node_id);

SuperOctantNodeId
    closest_super_octant_id=kClosestOctantIdForQuery
    [relative_position];

OctreeNodeId
    nearest_octree_node_id=kNearestOccupiedNodeId
    [closest_super_octant_id][leaf_node_value];
```

In some embodiments, with regard to LUT for overlapping octants and search order for octants, the system may assume:
query point is a specific leaf level octant called the query octant
the system has a max search radius predefined
the max search radius is an integral multiple $N_{SEARCH}$ of the voxel width (e.g., if voxel width is 5 cm and max search radius is 50 cm)
this gives the system $(N_{SEARCH}+1)^3$ possible leaf octants to search
In some embodiments, the system may then precompute:
For each possible relative position of the query octant within a level H octant
there are $2^{3(H+1)}$ possible positions, each query is one of these, and this is identifiable by the last 3(H+1) bits of the morton code of the query octant
For each relative position: i 0 . . . $2^{3(H+1)}-1$
for each level: j 2 . . . H
for each integral search radius r: 1 . . . $N_{SEARCH}$
precompute a 3D grid LUT of octants at level j
min Octant ID
max Octant ID
each entry:
sort order: 0 . . . N (where N is number of octants in this LUT
bit to indicate if there is any overlap (note there will sometimes be octants in the LUT that do not overlap, so the system may need to indicate that they are not to be searched)
for level 1: we have a LUT that takes the level 1 relative octree address and the occupancy byte of the level 1 children, and returns the closest occupied leaf octant id
for level 0: the system may have a LUT centered at the query octant and that spans the max search radius that includes:
distance to the query point
In some embodiments, the system may then perform the following search algorithm:
compute the morton code of the query octant, min_leaf_octant_id (note: the query may be outside the octree bounds, and the system may account for min_leaf_octant_id of the entire octree, and the system may not go lower)
compute the relative position index of the query octant to its parent node in level H
H_octant_id=query_octant_id>>3*(H+1)
RelIndex=3*(H+1) low order bits of query_octant_id
H_table=H_tables[RelIndex]
best_result.distance=search_radius
best_result.id=null.
for H_table_element: H_table
if H_table_element.min_distance>best_result.distance, break
node=HashTable(H_octant_id+H_table_element.offset)
if node==null, continue//empty octant
node.Search(query_octant_id, min_leaf_octant_id, H_table, & best_result)
Node::Search(query_octant_id, min_leaf_octant_id, H_table, *best_result)
level=this.level
h_table=H_table[level]
rel_node_index=RelNodeIndex(level, this.id, min_leaf_octant_id)
if L==1//leaf parent
// return the best occupied node if it is better, else just return
child_node_info=h_table[rel_node_index][this.occupancy_value]
if child_node_info.min_distance<best_result->distance,
best_result->distance=child_node_info.min_distance
best_result.id=child_node_info.id
return
// interior node
for child_node_info: h_table[rel_node_index].child_node_infos
child_node=node.children[child_node_info.index]
child_node.Search(query_octant_id, H_table, best_result)
RelNodeIndex(level, octant_id, min_leaf_octant_id)
// need to figure out the relative index of this node to the same level node that contains the min_leaf_octant_id At search time, the system may immediately know the order of octant searches that are needed, which may be precomputed in a series of LUTs that are defined for each level and relative.

With regard to LUT hash map optimization: neighbor node index, in some embodiments, the hash map allows the system to jump to a middle level in the octree, such as level 4 or 5. This may remove several levels of traversal instantly for a moderate LUT size. One problem may be a need to check neighbors, so depending on the size of the middle level nodes, the system may need to visit 27 or so nodes to complete a radius search. In some embodiments, the system may keep a list of occupied neighbor addresses with each of these nodes. This may incur extra cost since the system may need to add an entry for empty nodes that are adjacent to occupied nodes. However, the number of those nodes may be relatively small (approximately 2× the number of occupied nodes at that level). A common case may be that all 27 nodes are empty. This case may be ignored, which means a miss on the hash map returns no result (e.g., nothing is close enough).

In some embodiments, the system may achieve this with a dense voxel array at that level (e.g., if the level is 1 m wide in a 50 m3, there would be 125 k nodes). The benefit may be that the nodes could be small and neighbors can be checked quickly for occupancy. In some embodiments, the system may use a representation that is simply the index for the node if it contains any data or null for no data (e.g., 2-4 bytes per node depending on the size of the octree). The system may also do a quick sweep on creation and add a special value to indicate which of 27 neighbor nodes are non-empty without adding any data.

Figure 17:
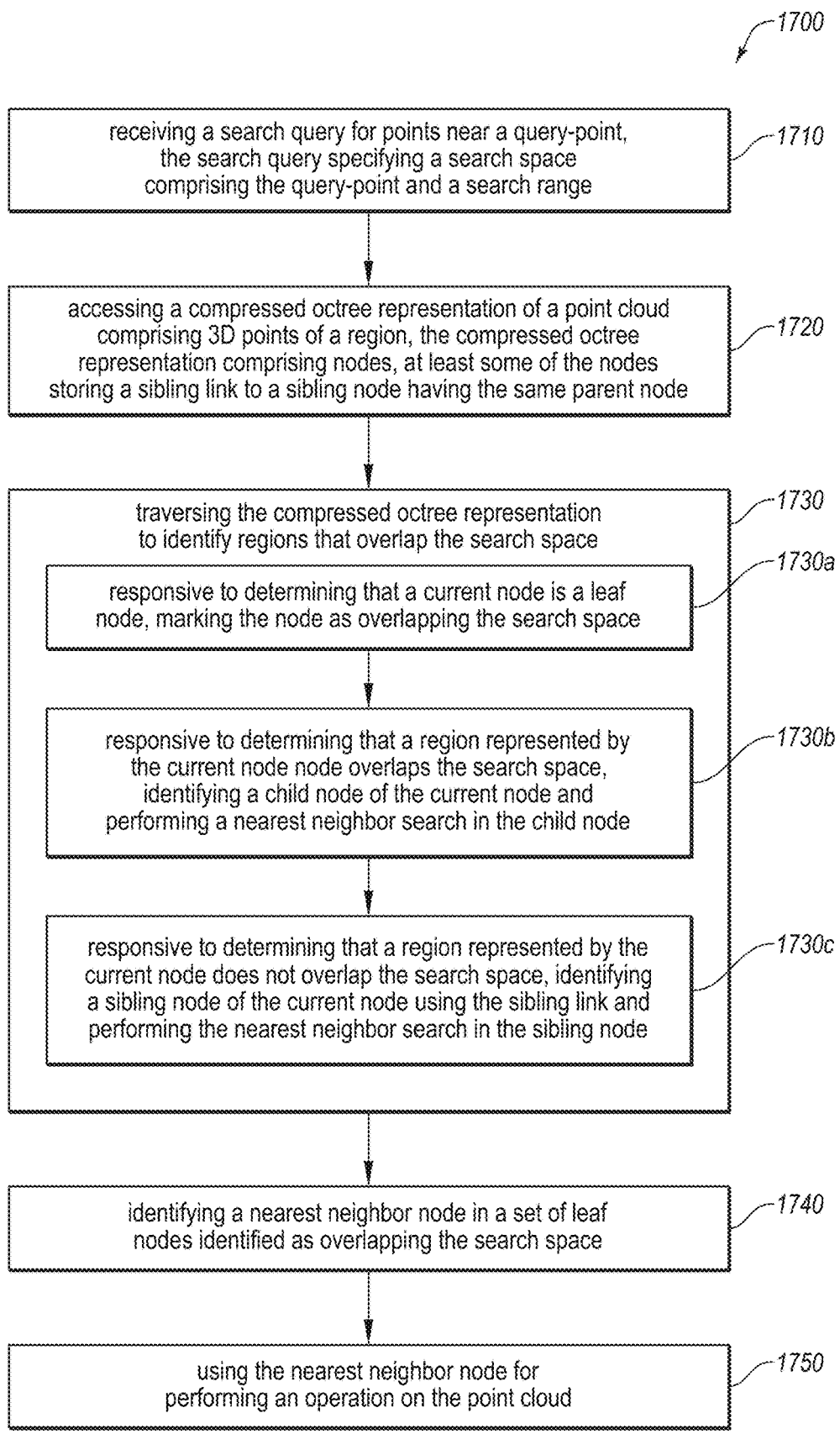
FIG. 17 illustrates a flow chart of an example method of nearest neighbor search using compressed octrees representing high definition maps for autonomous vehicles.

FIG. 17 illustrates a flow chart of an example method 1700 of nearest neighbor search using compressed octrees representing high definition maps for autonomous vehicles. The method 1700 may be performed by any suitable system, apparatus, or device. For example, one or more elements of the HD map system 100 of FIG. 1 may be configured to perform one or more of the operations of the method 1700. Additionally or alternatively, the computer system 1800 of FIG. 18 may be configured to perform one or more of the operations associated with the method 1700. Although illustrated with discrete blocks, the actions and operations associated with one or more of the blocks of the method 1700 may be divided into additional blocks, combined into fewer blocks, or eliminated, depending on the particular implementation.

The method 1700 may include, at action 1710, receiving, by an autonomous vehicle, a search query for points near a query-point, the search query specifying a search space comprising the query-point and a search range. For example, the HD map caching manager 295 of the vehicle computing system 120 of the vehicle 150a may receive, at action 1710, a search query for points near a query-point, with the search query specifying a search space comprising the query-point and a search range.

The method 1700 may include, at action 1720, accessing a compressed octree representation of a point cloud comprising 3D points of a region, the compressed octree representation comprising nodes, at least some of the nodes storing a sibling link to a sibling node having the same parent node. In some embodiments, the sibling link may store an index of the sibling node, the index identifying the sibling node in a linear array. In some embodiments, the sibling link may store an offset value that stores a relative position of the sibling node with respect to the current node. In some embodiments, the compressed octree representation may be represented as a linear array of structures, each structure representing a node. In these embodiments, the linear array of structures may store the nodes in a depth first search order of traversal of the compressed octree representation. In some embodiments, each node may be represented as a byte such that each bit of the byte indicates whether a child node is present. For example, the HD map caching manager 295 of the vehicle computing system 120 of the vehicle 150a may access, at action 1720, a compressed octree representation of a point cloud comprising 3D points of a region, with the compressed octree representation including nodes, with at least some of the nodes storing a sibling link to a sibling node having the same parent node.

The method 1700 may include, at action 1730, traversing the compressed octree representation to identify regions that overlap the search space by, at action 1730a, responsive to determining that a current node is a leaf node, marking the node as overlapping the search space, at action 1730b, responsive to determining that a region represented by the current node overlaps the search space, identifying a child node of the current node and performing a nearest neighbor search in the child node, and at action 1730c, responsive to determining that a region represented by the current node does not overlap the search space, identifying a sibling node of the current node using the sibling link and performing the nearest neighbor search in the sibling node. For example, the HD map caching manager 295 of the vehicle computing system 120 of the vehicle 150a may traverse, at action 1730, the compressed octree representation to identify regions that overlap the search space by, at action 1730a, responsive to determining that a current node is a leaf node, marking the node as overlapping the search space, at action 1730b, responsive to determining that a region represented by the current node overlaps the search space, identifying a child node of the current node and performing a nearest neighbor search in the child node, and at action 1730c, responsive to determining that a region represented by the current node does not overlap the search space, identifying a sibling node of the current node using the sibling link and performing the nearest neighbor search in the sibling node.

The method 1700 may include, at action 1740, identifying a nearest neighbor node in a set of leaf nodes identified as overlapping the search space. For example, the HD map caching manager 295 of the vehicle computing system 120 of the vehicle 150a may identify, at action 1740, a nearest neighbor node in a set of leaf nodes identified as overlapping the search space.

The method 1700 may include, at action 1750, using the nearest neighbor node for performing localization of the autonomous vehicle. For example, the HD map caching manager 295 of the vehicle computing system 120 of the vehicle 150a may use, at action 1750, the nearest neighbor node for performing localization of the autonomous vehicle 150a.

Subsequent to the action 1750, the method 1700 may employ the localization of the autonomous vehicle 150a to navigate the autonomous vehicle 150a through a local environment. Further, the method 1700 may be employed repeatedly as the vehicle 150a navigates along a road. For example, the method 1700 may be employed with the vehicle 150a (or another non-autonomous vehicle) starts driving, and then may be employed repeatedly during the navigation of the vehicle 150a (or another non-autonomous vehicle). The vehicle 150a may navigate by sending control signals to controls of the vehicle 150a. The method 1700 may be employed by the vehicle computing system 120a of the vehicle 150a by performing the nearest neighbor search directly on the compressed octree representation without having to decompress the compressed octree representation to recreate the 3D point cloud, to assist in the continual and efficient localization of the vehicle 150a.

In some embodiments, the method 1700 may use the nearest neighbor node for performing other operations on the point cloud. For example, the nearest neighbor node may be used to align the point cloud with another point cloud. In another example, the nearest neighbor node may be used to detect whether an object in the point cloud is about to collide, or has collided, with another object in another point cloud. In another example, the nearest neighbor node may be used to detect a dynamic object in the point cloud. Further, in some embodiments, the method 1700 may be employed in applications other than autonomous vehicles, such as in other applications where a nearest neighbor search of 3D points is employed, which may include, but is not limited to, computer graphics, 3D modeling, medical imaging, oil and gas surveying, etc.

As discussed in greater detail below, the nearest neighbor search of the method 1700 may be employed in connection with the HD map caching manager 295 of the vehicle computing system 120 of the autonomous vehicle 150 to perform localization of the autonomous vehicle 150.

HD Map Cache Management

Figure 9:
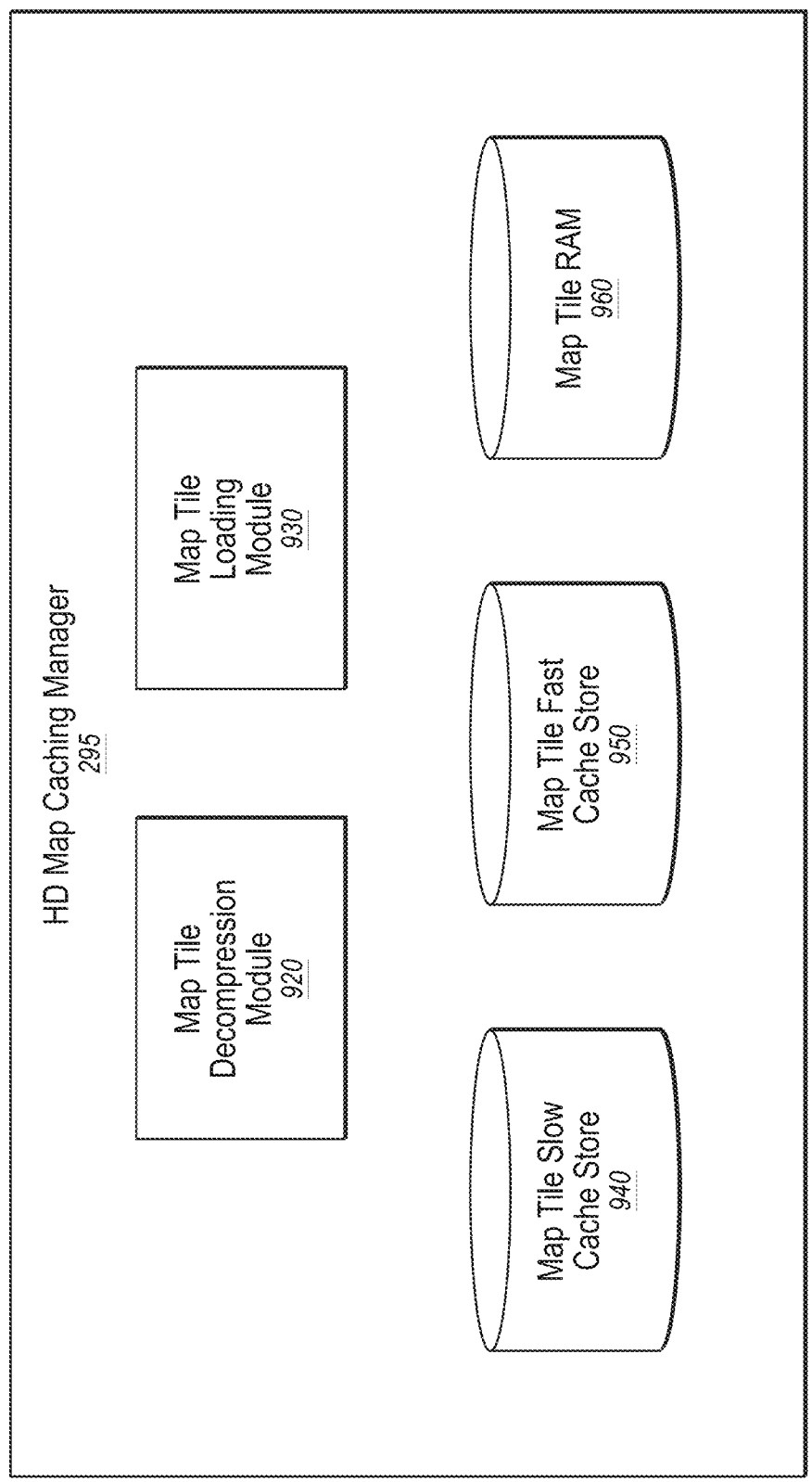
FIG. 9 illustrates an example system architecture of an HD map caching manager.

FIG. 9 illustrates an example system architecture of the HD map caching manager 295. In some embodiments, the HD map caching manager 295 may process the HD map data and store the HD map data for use by various modules of the vehicle computing system 120. The HD map data may include discrete portions of the HD map called map tiles. Processing the HD map data by the HD map caching manager 295 may involve a variety of processes which may include, but are not limited to, decompressing compressed formats of the HD map data, indexing the HD map data, partitioning the HD map data into subsections, loading the HD map data, and storing the HD map data. Additionally, the HD map caching manager 295 may include a variety of modules for accomplishing the processing of the HD map data and/or a variety of stores for storing the HD map data in its initial format, its intermediary formats in processing of the HD map data, and/or its terminal format for use by the other modules. For example, in some embodiments, the HD map caching manager 295 may include a map tile decompression module 920 and a map tile loading module 930 for processing the HD map data. The HD map caching manager 295 may also include a map tile slow cache store 940, a map tile fast cache store 950, and a map tile RAM 960. In some embodiments, the map tile slow cache store 940 may employ similar functionality as the local HD map store 275 of FIG. 2. In some embodiments, the map tile RAM 960 may be incorporated into another RAM on the vehicle computing system 120.

The map tile decompression module 920 may decompress the compressed HD map data received by the online HD map system 110. The map tile decompression module 920 may perform a series of algorithms on the compressed HD map data for restoring the resolution of the HD map data. With varying compression algorithms, the map tile decompression module 920 may vary in its decompression algorithms. For example, some example compression models may utilize probability in creating probabilistic models for determining statistical patterns within the HD map data. The statistical patterns may be reduced to statistical redundancies which represent the full-sized HD map data. In these examples, the map tile decompression module 920 may receive the statistical redundancies as the compressed HD map data and may reconstruct the full sized HD map data with algorithms applied to the statistical redundancies. After the map tile decompression module 920 decompresses the compressed HD map data into decompressed HD map data, the map tile decompression module 920 may store the decompressed HD map data as accessible map tiles. In some embodiments, the map tile decompression module 920 may index the decompressed HD map data. As the HD map data is partitioned into map tiles, the map tile decompression module 920 may augment the accessible map tiles with coordinates of a grid. The coordinates of the grid may help in relating accessible map tiles to one another in context of the grid. In some embodiments, the accessible map tiles may have square dimensions and the map tile decompression module 920 may augment each accessible map tile with a pair of coordinates (e.g., (2, 3) or (3, 12)). In line with the indexing of the accessible map tiles, the map tile decompression module 920 may further augment each accessible map tile with other metadata. Different types of metadata may include, but are not limited to, categories of map tiles, unique identifiers for each map tile, timestamps of receipt of each map tile, location data such as GPS coordinates, etc.

The map tile loading module 930 may load the accessible map tiles into the map tile RAM 960. As the accessible map tiles are in a decompressed format, the accessible map tiles may be larger-sized files as compared to the map tiles in the compressed format. The map tile loading module 930 may retrieve select accessible map tiles for loading into the map tile RAM 960. The map tile loading module 930 may determine which accessible map tiles to retrieve for loading into the map tile RAM 960. The map tile loading module 930 may receive localization data specifying a position of the vehicle 150 in the HD map. The map tile loading module 930 may identify the current accessible map tile in which the position of the vehicle 150 is located. The map tile loading module 930 may load the current accessible map tile in the map tile RAM 960. The map tile loading module 930 may determine subsequent subsets of accessible map tiles in preparation for loading in the map tile RAM 960.

In some embodiments, the stores for storing the varying formats of the HD map data by the HD map caching manager 295 may include the map tile slow cache store 940, the map tile fast cache store 950, and the map tile RAM 960. The varying stores may streamline efficient decompression and loading of the map tiles stored by the vehicle computing system 120. In some embodiments, the map tile slow cache store 940 may be integrated as, or as a part of, the local HD map store 275 of FIG. 2. The map tile slow cache store 940 may store a compressed format of map tiles. Storing compressed map tiles in the map tile slow cache store 940 may be relatively inexpensive in terms of computing resources. The map tile fast cache store 950 may store decompressed map tiles with any additional features added by the decompression module 920 as accessible map tiles. Storing decompressed map tiles may be costly with regard to computing resources as decompressed map tiles maintain the full resolution of the HD map as generated by the online HD map system 110. Additional features such as indices or tags associated with the decompressed map tiles may increase the amount of data each accessible map tile contains. The map tile RAM 960 may store accessible map tiles currently in use by the vehicle computing system 120. The HD map caching manager 295 may provide the accessible map tiles within the map tile RAM 960 for interaction with the other modules of the vehicle computing system 120 in navigating the vehicle 150.

Figure 10:
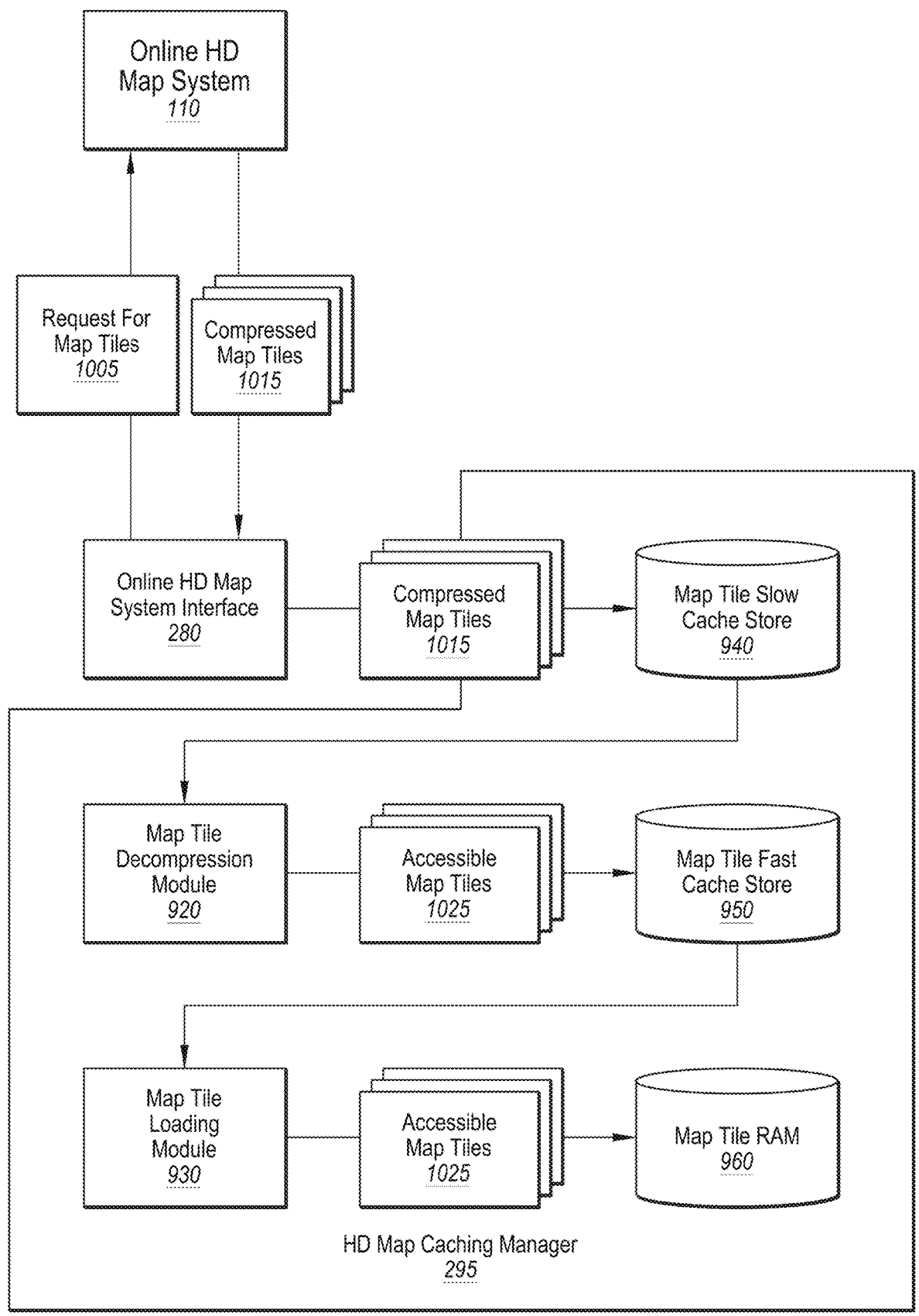
FIG. 10 illustrates a flow chart of an example method for efficiently utilizing compressed map tiles of an HD map from an online HD map system by a vehicle computing system.

FIG. 10 illustrates a flow chart of an example method for efficiently utilizing compressed map tiles 1015 of the HD map from the online HD map system 110 by the vehicle computing system 120. The method of FIG. 10 may be performed by any suitable system, apparatus, or device. For example, one or more elements of the HD map system 100 of FIG. 1 may be configured to perform one or more of the operations of the method of FIG. 10. Additionally or alternatively, the computer system 1800 of FIG. 18 may be configured to perform one or more of the operations associated with the method of FIG. 10. Although illustrated with discrete blocks, the actions and operations associated with one or more of the blocks of the method of FIG. 10 may be divided into additional blocks, combined into fewer blocks, or eliminated, depending on the particular implementation.

Upon determining a route, the vehicle computing system 120 may provide the HD map caching manager 295 with the determined route. The HD map caching manager 295 may assess whether all map tiles corresponding to the determined route are present in the map tile slow cache store 940 and up to date. If there are missing map tiles or outdated map tiles, the HD map caching manager 295 may prepare a request for map tiles 1005 to be sent to the online HD map system 110 for the missing or updated map tiles. The request for map tiles 1005 may be passed through the online HD map system interface 280 to the online HD map system 110. The online HD map system 110 may respond to the request for map tiles 1005 with one or more compressed map tiles 1015. The online HD map system interface 280 may direct the compressed map tiles 1015 to the HD map caching manager 295.

The HD map caching manager 295 may receive the compressed map tiles 1015 and prepare them for use by the various modules of the vehicle computing system 120. The HD map caching manager 295 may first store the compressed map tiles 1015 in the map tile slow cache store 940. As the map tile slow cache store 940 stores map tiles in the compressed format, the map tile slow cache store 940 may store compressed map tiles for a plurality of routes or for an entire region of the HD map. In some cases, the HD map caching manager 295 may evaluate previously used compressed map tiles stored in the map tile slow cache store 940 for removal from the map tile slow cache store 940. In any case, the HD map caching manager 295 may store compressed map tiles in the map tile slow cache store 940 as compressed map tiles that are relatively inexpensive in terms of computing resources. According to the determined route, the HD map caching manager 295 may prompt the map tile decompression module 920 to decompress the map tiles corresponding to the determined route. The map tile decompression module 920 may decompress the map tiles and adds additional features or tags such as indices. The map tile decompression module 920 may store the decompressed map tiles as accessible map tiles 1025 in the map tile fast cache store 950. In some embodiments, the map tile fast cache store 950, at any given time, may store accessible map tiles 1025 corresponding to a single route. Storing decompressed map tiles with additional features may utilize more computing resources than storing compressed map tiles, and thus the map tile fast cache store 950 may be relatively more expensive in terms of computing resources as compared to the map tile slow cache store 940. The map tile loading module 930 may receive location data of the vehicle 150 and may determine a set of coordinates corresponding to the location of the vehicle 150 within the HD map. The map tile loading module 930 may retrieve the accessible map tile corresponding to the set of coordinates and may load the accessible map tile in the map tile RAM 960. The map tile loading module 930 may then retrieve subsequent accessible map tiles 1025 to load in the map tile RAM 960, with the subsequent accessible map tiles 1025 selected as potential near-future locations of the vehicle 150 in the HD map.

As the vehicle 150 drives along the determined route, the route generation module 290 may dynamically update the route. As the route is dynamically updated, the map tile loading module 930 may ensure that the current accessible map tile is loaded in the map tile RAM 960. If not, the map tile loading module 930 may load the current accessible map tile in the map tile RAM 960 and then load subsequent accessible map tiles 1025 in the map tile RAM 960 according to the dynamically updated route, wherein each subsequent accessible map tile corresponds to a dynamically updated partial route. For example, the route generation module 290 may determine likely near-future positions of the vehicle after an amount of time (e.g., 2 seconds) of driving along the current route and may load in the map tile RAM 960 the accessible map tiles 1025 corresponding to the likely near-future positions. The amount of time or time window can be balanced against the available RAM in the system, where more RAM can have a larger window of time. In some embodiments, the map tile RAM 960, at any given time, may have accessible map tiles 1025 currently in use by modules of the vehicle computing system 120 for navigating the vehicle 150 or to be used for navigating the vehicle 150 in the near-future.

As computing memory in the map tile RAM 960 may be more limited than computing memory in the map tile fast cache store 950 and in the map tile slow cache store 940, the HD map caching manager 295 may efficiently minimize accessible map tiles 1025 stored in the map tile RAM 960 at a given time. The HD map caching manager 295 may likewise only decompresses map tiles from the map tile slow cache store 940 for determined routes, thereby minimizing decompressed map tiles needing to be stored by the map tile fast cache 950. This method of efficiently utilizing compressed map tiles 1015 of the HD map from the online HD map system 110 by a vehicle computing system 120 may minimize needless use of computing resources. The HD map caching manager 295 may manage disk space used (e.g., by deciding which compressed tiles are downloaded and which tiles are decompressed on disk) and RAM used (e.g., by deciding which and when tiles are loaded).

Figure 11:
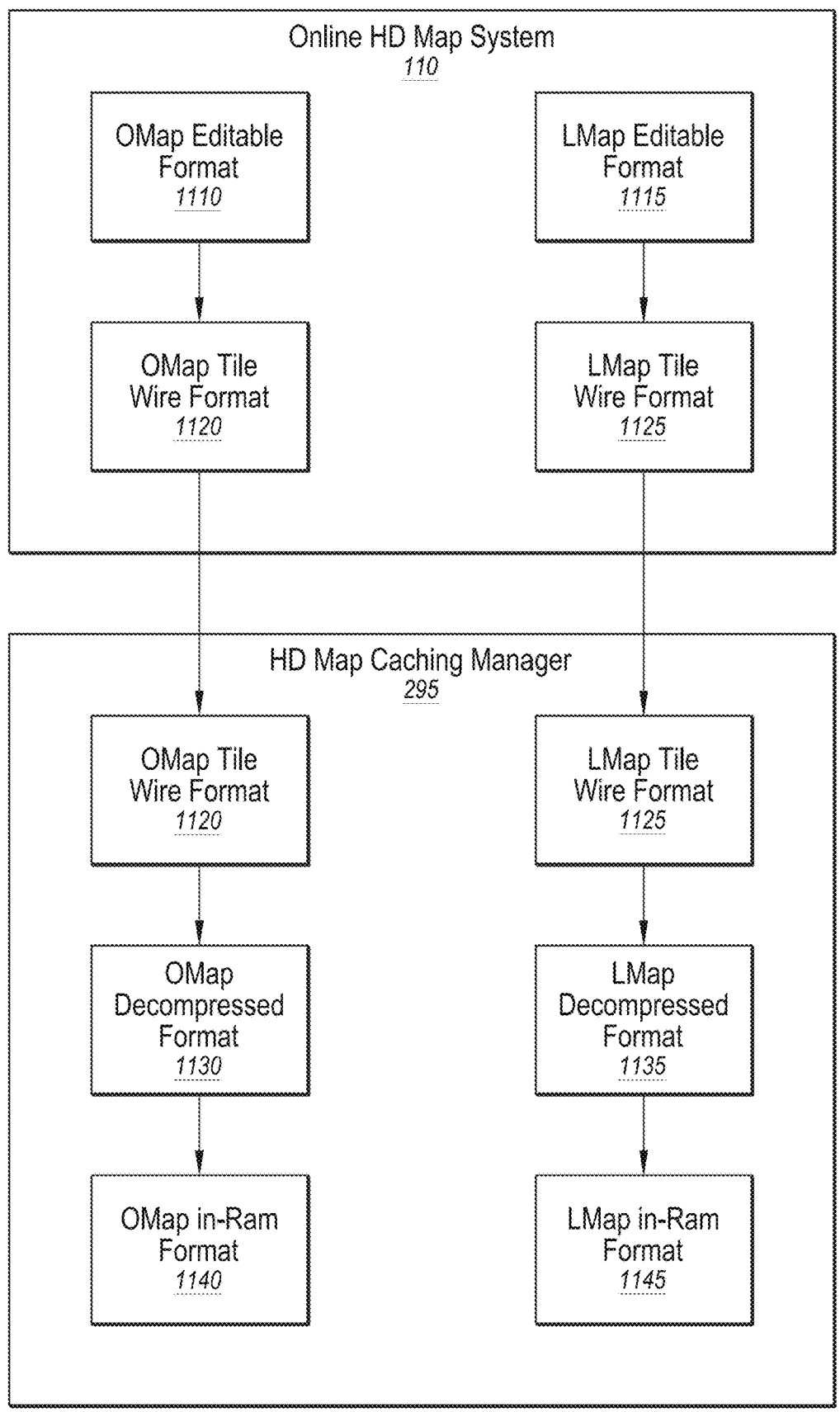
FIG. 11 illustrates a flow chart of another example method for efficiently utilizing compressed map tiles of an HD map from an online HD map system by a vehicle computing system.

FIG. 11 illustrates another example method of efficiently utilizing compressed map tiles of the HD map from the online HD map system 110 by a vehicle computing system 120. The method of FIG. 11 may be performed by any suitable system, apparatus, or device. For example, one or more elements of the HD map system 100 of FIG. 1 may be configured to perform one or more of the operations of the method of FIG. 11. Additionally or alternatively, the computer system 1800 of FIG. 18 may be configured to perform one or more of the operations associated with the method of FIG. 11. Although illustrated with discrete blocks, the actions and operations associated with one or more of the blocks of the method of FIG. 11 may be divided into additional blocks, combined into fewer blocks, or eliminated, depending on the particular implementation.

As disclosed in FIG. 11, the online HD map system 110 may include two components of an HD map 510, namely, an Occupancy Map (OMap) 530 and a Landmark Map (LMap) 520, as disclosed in FIG. 5. The online HD map system 110 may store the OMap 530 in an OMap editable format 1110, and similarly may store the LMap 520 in an LMap editable format 1115, at the online HD map system 110. The online HD map system 110 may utilize these editable formats for generating and/or updating the OMap 530 and the LMap 520. When the updated OMap 530 and the updated LMap 520 are ready for transference to the vehicle computing system 120, the online HD map system 110 may compress the OMap 530 into an OMap tile wire format 1120 and similarly may compress the LMap 520 into an LMap tile wire format 1125. These tile wire formats may then be transferred to the vehicle computing system 120, and more specifically to the HD map caching manager 295. The HD map caching manager 295 may decompress these tile wire formats into the OMap decompressed format 1130 and the LMap decompressed format 1135. When the HD map caching manager 295 loads the OMap decompressed format 1130 and the LMap decompressed format 1135 in the map tile RAM 960, the map tile RAM 960 may contain the OMap in-RAM format 1140 and the LMap in-RAM format 1145 for access by other modules of the vehicle computing system 120.

Since it may not be possible to download the entire HD map 510 onto the vehicle computing system 120, some embodiments may provide route management to determine which routes are most likely to be driven in the near future by the vehicle 150. When a route is selected to be driven, some embodiments may ensure that the data for that route is cached on the vehicle computing system 120 before the vehicle 150 begins driving the route. Once the data is download onto the vehicle computing system 120, some embodiments may ensure that the vehicle can use it efficiently by loading the data into memory. To use the data efficiently (e.g., with low latency), the data may be accessible using an optimized data structure, which may include an indexed data structure such as a map or a tree. Instead of sending indexed data from the online HD map system 110, some embodiments may optimize network bandwidth usage by sending a very highly compressed form of the map data that contains only the essential material needed. This may provide a relatively small payload from the online HD map system 110 and a small disk footprint when stored on disk at the vehicle computing system 120. In some embodiments, this may involve a Level 3 Disk cache, which may correspond to the OMap and LMap tile wire formats 1120 and 1125, and which may be stored on a relatively slow and inexpensive disk.

From the Level 3 cache, some embodiments may construct a more usable disk cache that can be loaded into memory directly and used immediately, which may involve a Level 2 cache, which may correspond to the OMap and LMap decompressed formats 1130 and 1135. This Level 2 cache may contain a set of files which: (1) contain the decompressed map data, (2) contain any indexes needed by the APIs to access the data, (3) are split up into sub-tiles to allow for access of the data at a granular level that is optimized for dynamic loading as the vehicle 150 moves through the world, and (4) are directly loadable into memory and provide immediate access to the data. Level 2 cache files may only be created when anticipated to be used, such as on or along a route that is about to commence.

In some embodiments, a memory cache may be a Level 1 cache, which may correspond to OMap in-RAM formats 1140 and 1145. At this level, there may be possible paths of the vehicle 150, and some embodiments may maintain an active wavefront around and in front of the vehicle 150 of the tiles and sub-tiles. After each localization call, some embodiments may update the estimate of the vehicle's location. Some embodiments may then re-analyze the possible paths for the next few seconds of travel, and initiate loads of the predicted tiles and sub-tiles from the Level 2 cache. These loads may happen asynchronously while the computations are happening, and the Level 1 cache may safely assume that the necessary data is always loaded before an access request for the data occurs. This may be done by ensuring that the predicted paths are sufficiently ahead of the car and that these paths are updated frequently.

Figure 12:
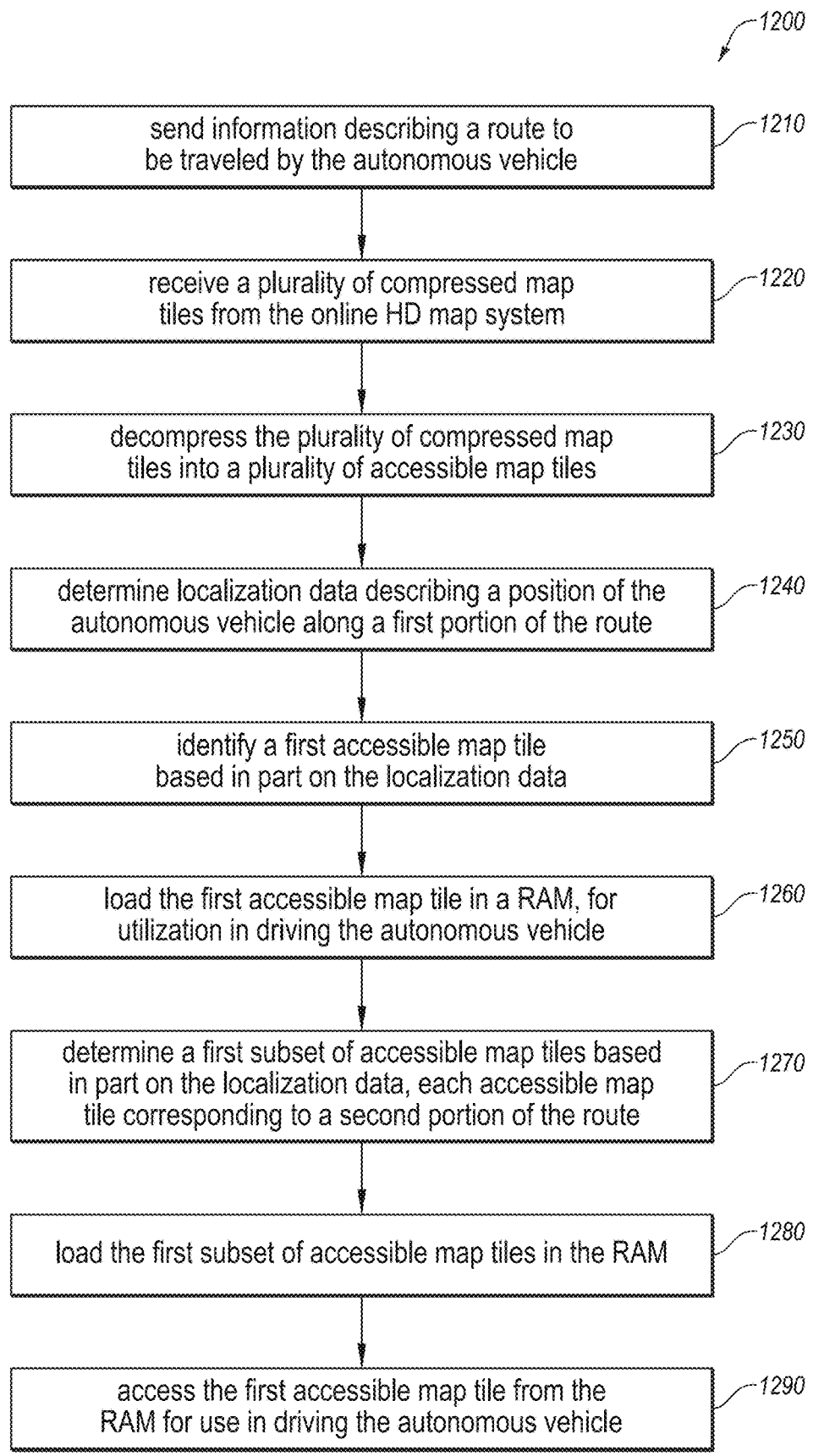
FIG. 12 illustrates a flow chart of another example method for efficiently utilizing compressed map tiles of an HD map from an online HD map system by a vehicle computing system.

FIG. 12 illustrates a flowchart of another example method 1200 for efficiently utilizing compressed map tiles of the HD map from the online HD map system 110 by a vehicle computing system 120. The method 1200 may be performed by any suitable system, apparatus, or device. For example, one or more elements of the HD map system 100 of FIG. 1 may be configured to perform one or more of the operations of the method 1200. Additionally or alternatively, the computer system 1800 of FIG. 18 may be configured to perform one or more of the operations associated with the method 1200. Although illustrated with discrete blocks, the actions and operations associated with one or more of the blocks of the method 1200 may be divided into additional blocks, combined into fewer blocks, or eliminated, depending on the particular implementation.

The method 1200 may begin with a passenger requesting to drive a route, and with sending, at 1210, information describing a route to be travelled by the autonomous vehicle 150a to the online HD map system 110. The system may then ensure that the necessary tiles are loaded onto the vehicle computing system 120. For example, the system may inspect the Level 3 cache to identify map tiles that are already downloaded and collect the version of each map tile. The vehicle computing system 120 may send a request to the online HD map system 110 with a list of the missing or outdated tiles as well as the versions that the vehicle computing system 120 already has. The method 1200 may then receive, at 1220, a plurality of compressed map tiles from the online HD map system 110. For example, the online HD map system 110 may respond with the list of the latest tiles that are available. The online HD map system 110 may not return tiles that are already up-to-date on the vehicle computing system 120. The vehicle computing system 120 may make a request to download each new tile. If the disk is full, the vehicle computing system 120 may need to delete Level 3 tiles that are least recently used to make room. The vehicle computing system 120 may then ensure that all the tiles have been converted to the Level 2 cache. If the disk is full, the vehicle may delete Level 2 tiles that are least recently used to make room.

The system may then decompress, at 1230, the plurality of compressed map tiles into accessible map tiles. The system may further determine, at 1240, localization data describing a position of the autonomous vehicle 150 along a first portion of the route and may identify, at 1250, a first accessible map tile based in part on the localization data. The in-RAM cache may then be initialized, and a localization bootstrap may be performed that uses synchronous loading of tiles around the vehicle 150, which can take approximately 1 second for example. In some embodiments, the system may load, at 1260, the first accessible map tile in a RAM for utilization in driving the autonomous vehicle 150. The system may further determine, at 1270, a first subset of accessible map tiles based in part on the localization data, with each accessible map tile corresponding to a second portion of the route, and then load, at 1280, the first subset of accessible map tiles in the RAM. Then the system may then access, at 1290, the first accessible map tile from the RAM for use in driving the autonomous vehicle. In other words, once the location of the vehicle 150 is determined, the in-RAM cache may use the computed route and vehicle's position and heading to predict the next time period (e.g., 2 seconds worth) of possible travel, and can load all of these tiles into RAM, to enable the vehicle 150 to proceed on the route. As the vehicle computing system 120 collects sensor data (e.g., at 10-20 Hz), the system may update its estimate and the in-RAM cache may recompute the predicted paths and may asynchronously load those tiles while removing tiles that are no longer in the predicted vehicle area or envelope.

Figure 13:
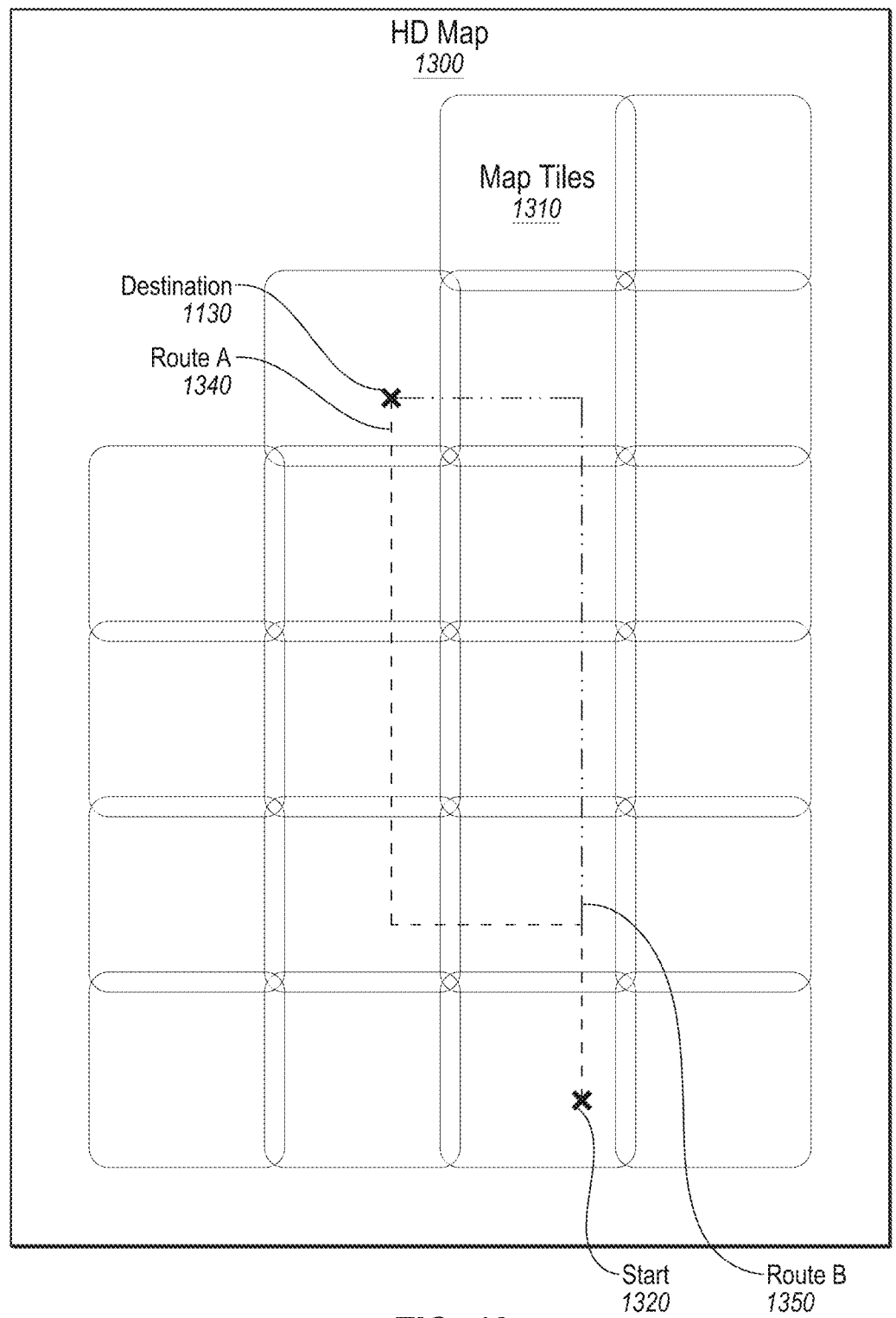
FIG. 13 illustrates a flow chart of an example process of loading accessible map tiles in a RAM for use in driving a vehicle.

FIG. 13 illustrates a flow chart of an example process of loading accessible map tiles 1310 in a RAM for use in driving a vehicle. In some embodiments, the vehicle computing system 120 may receive a start 1320 and a destination 1330. The vehicle computing system 120 may locate geographical coordinates of the start 1320 and the destination 1330 as corresponding to map tiles of the plurality of map tiles 1310 within an HD map 1300. The vehicle computing system 120 may determine one or more routes, such as route A 1340 and route B 1350, for driving the autonomous vehicle 150 from the start 1320 to the destination 1330. As illustrated, route A 1340 and route B 1350 may drive along the same map tile initially but may then diverge to drive along different map tiles to the destination 1330. As two routes are determined as potential routes for driving the autonomous vehicle, the vehicle computing system 120 may decompress all map tiles 1310 inclusive of route A 1340 and route B 1350. The vehicle computing system 120 may additionally decompresses map tiles neighboring map tiles along route A 1340 and route B 1350. The vehicle computing system 120 may load the current map tile in a RAM of the vehicle computing system 120. As the autonomous vehicle 150 begins to drive along one of the routes, the vehicle computing system 120 may continuously determine localization data. The vehicle computing system 120 may continuously determine which current map tile corresponds to the current location of the autonomous vehicle 150. Likewise, the vehicle computing system 120 may load map tiles ahead of the current location of the autonomous vehicle 150 such that the vehicle computing system 120 may access map tiles ahead of the current location. In some embodiments, the map tiles ahead of the current location may help the vehicle computing system 120 update routes.

Map Tiles

In some embodiments, a system API may provide access to: (1) 3D OMap data which may be a 3D volumetric grid representation of all the roads and surroundings, (2) 3D LMap data which may be a 3D representation of lanes and line and signs that represents the 3D constraints of the road as well as semantic rules of the road. The OMap data may be generally used for fast computation of the location of a vehicle relative to the HD map. This may be performed using various different techniques including, for example, a technique generally known as Iterative Closest Point (ICP), which may take a sensor point reading, from a LIDAR sensor for example, and compute the closest point from the LIDAR point to a point on the HD map. In some embodiments, the system may do millions of these lookups per second.

To facilitate this relatively fast lookup, the Level 2 cache representation of the OMap may be in a kd-tree (and other spatial indexes may be handled equivalently). The wire format OMap tiles may be roughly 500 m×500 m in area, which may be bigger than the vehicle's nominal predicted envelope over 2 seconds. In other embodiments, the wire format OMap tiles may be roughly 50 m×50 m in area. Loading a kd-tree with that much data may be prohibitive in disk read cost and memory usage. Therefore, in some embodiments, the system may divide up the tiles into a grid of sub-tiles (e.g., 8×8 sub-tiles). These sub-tiles may be stored as files in the Level 2 cache and the spatial search index may be pre-computed and stored with the sub-tiles. Thus, the sub-tiles may be loaded directly into RAM and may be instantly used for spatial lookups. In addition, indexes on other attributes may be precomputed to enable different types of localization methods, for example, indexing on the color or intensity of points, or an attribute which identifies if the point is on the ground or another type of object.

To save space, the sub-tiles may be stored in their own coordinate system so the coordinates can be encoded in fewer bytes. This may involve a translation of the query point and results before and after each kd-tree lookup in a sub-tile. The API may access the OMap as if it were a single kd-tree, but this may actually be a kd-tree wrapping multiple smaller adjacent kd-trees.

The LMap data may be organized as a connected graph of Lane Elements. Lane Elements may be a generic map entity used by the vehicle. Lane Elements may be accessed in at least two ways: (1) spatial lookup by LatLngAlt to find Lane Elements that overlap a specific location, and (2) lookup by identifier (ID). The spatial lookup may be managed by putting the Lane Elements into a Spatial 2D Array indexed by LatLng. For a specific LatLng, the system may obtain a list of Lane Elements for which there will be a more detailed geometric overlap test. The system may then return the overlapping Lane Elements. Lookup by ID may simply be a map from ID to Lane Element.

In some embodiments, LMap data may be small enough that an entire LMap tile may be loaded into RAM efficiently. The LMap tiles may be kept loaded much like the OMap tiles by the in-RAM cache manager. Access may be made immediate by the API to enable these lookups to be directly supported in RAM.

In some embodiments, the LMap may be a connected graph of lane elements, where the graph spans the tiles. The information in the LMap (e.g., semantics, rules, and geometry) may be retrievable via the lane element. The system may allow the data to be loadable into RAM so that accesses to the LMap are essentially memory lookups. Although a more conventional process may include (1) a localization result returning a LatLng and heading, (2) determining the spatial area of interest around the LatLng heading, (3) querying the database (e.g., using SQL) to retrieve map elements of a specific type, and (4) walking through a list of results to find the element(s) of interest, some embodiments may simply include (1) a localization result providing a lane element ID (e.g., answering the query "where am I"), and (2) looking at the lane element (already in RAM) via a function: const LaneElement & lane_element=lane_element_array[lane_element_id], which may be implemented in an API as a function such as GetLaneElement(int id), and may involve an array index of the information which is already loaded into RAM.

Computer System Architecture

Figure 18:
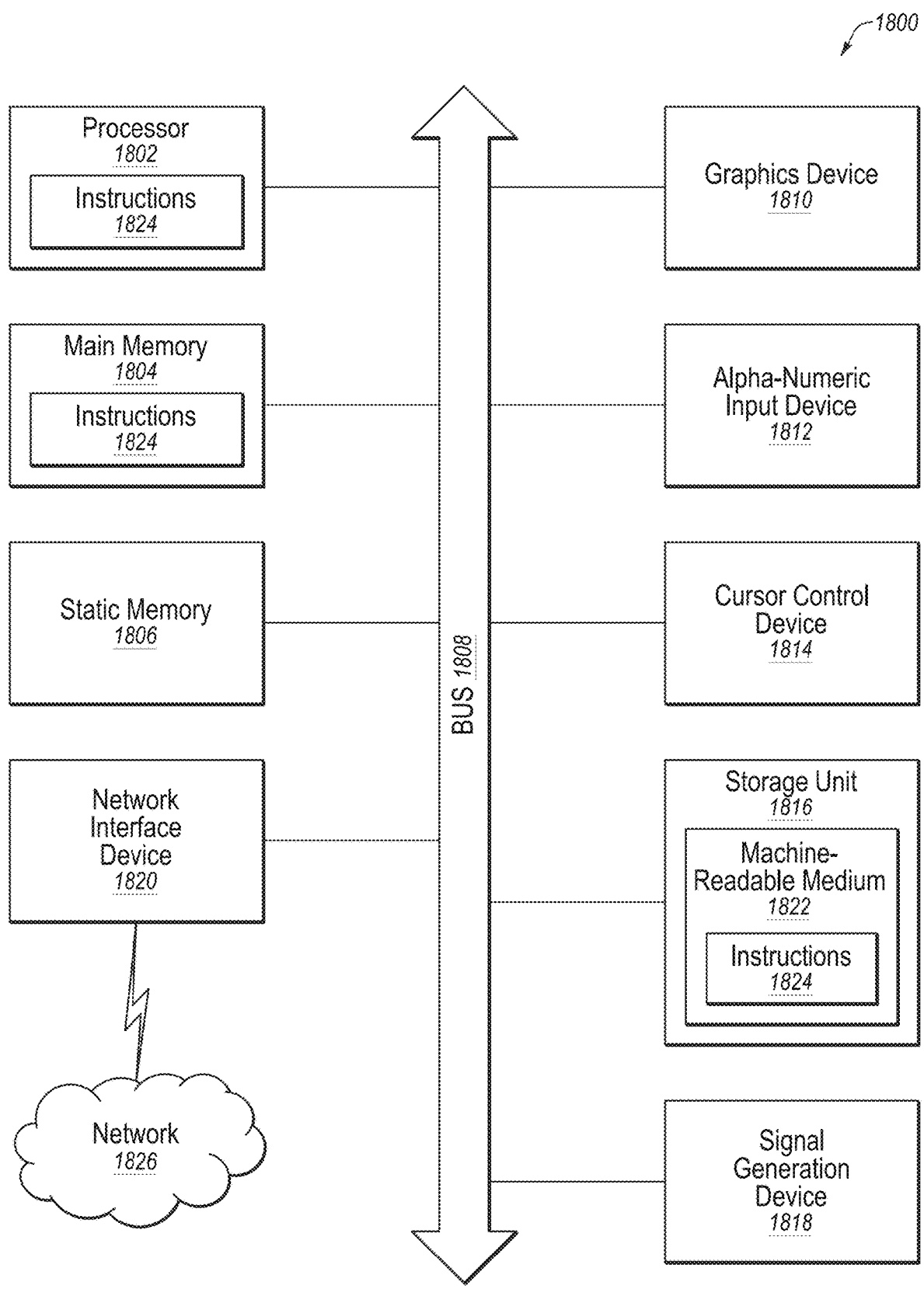
FIG. 18 illustrates an example embodiment of a computing machine that can read instructions from a machine-readable medium and execute the instructions in a processor or controller.

FIG. 18 is a block diagram illustrating components of an example computer system able to read instructions from a machine-readable medium and execute them in a processor (or controller). Specifically, FIG. 18 shows a diagrammatic representation of a machine in the example form of a computer system 1800 within which instructions 1824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1824 (sequential or otherwise) that specify actions to be taken by that machine. Further, while only a single machine is illustrated, the term "machine" shall also be taken to include any collection of machines that individually or jointly execute instructions 1824 to perform any one or more of the methodologies discussed herein.

The example computer system 1800 may be part of or may be any applicable system described in the present disclosure. For example, the online HD map system 110 and/or the vehicle computing systems 120 described above may comprise the computer system 1800 or one or more portions of the computer system 1800. Further, different implementations of the computer system 1800 may include more or fewer components than those described herein. For example, a particular computer system 1800 may not include one or more of the elements described herein and/or may include one or more elements that are not explicitly discussed.

The example computer system 1800 includes a processor 1802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1804, and a static memory 1806, which are configured to communicate with each other via a bus 1808. The computer system 1800 may further include graphics display unit 1810 (e.g., a plasma display panel (PDP), a liquid crystal display (LCD), a projector, or a cathode ray tube (CRT)). The computer system 1800 may also include alphanumeric input device 1812 (e.g., a keyboard), a cursor control device 1814 (e.g., a mouse, a trackball, a joystick, a motion sensor, or other pointing instrument), a storage unit 1816, a signal generation device 1818 (e.g., a speaker), and a network interface device 1820, which also are configured to communicate via the bus 1808.

The storage unit 1816 includes a machine-readable medium 1822 on which is stored instructions 1824 (e.g., software) embodying any one or more of the methodologies or functions described herein. The instructions 1824 (e.g., software) may also reside, completely or at least partially, within the main memory 1804 or within the processor 1802 (e.g., within a processor's cache memory) during execution thereof by the computer system 1800, the main memory 1804 and the processor 1802 also constituting machine-readable media. The instructions 1824 (e.g., software) may be transmitted or received over a network 1826 via the network interface device 1820.

While machine-readable medium 1822 is shown in an example embodiment to be a single medium, the term "machine-readable medium" should be taken to include a single medium or multiple media (e.g., a centralized or distributed database, or associated caches and servers) able to store instructions (e.g., instructions 1824). The term "machine-readable medium" shall also be taken to include any medium that is capable of storing instructions (e.g., instructions 1824) for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONFIGURATION CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A computer-implemented method, comprising:
    receiving a search query, the search query specifying a search space comprising a query-point and a search range, the query-point being included in a first point cloud comprising a first set of three-dimensional (3D) points that correspond to at least a portion of a region;
    accessing a compressed octree representation of a second point cloud comprising a second set of 3D points that correspond to the region, the compressed octree representation comprising nodes, at least some of the nodes storing a sibling link to a sibling node having the same parent node;
    traversing the compressed octree representation to identify one or more nodes that correspond to the search space, the traversing comprising selecting a current node of the compressed octree representation and performing traversing operations, the traversing operations including:
        responsive to determining that the current node is a leaf node and that one or more coordinates associated with the current node are included in the search space, marking the current node as corresponding to the search space,
        responsive to determining that the current node is not a leaf node and determining that one or more coordinates associated with the current node are included in the search space, identifying a child node of the current node and performing the traversing operations with respect to the identified child node in which the identified child node is selected as the next current node used in the traversing operations, and
        responsive to determining that no coordinates associated with the current node are included in the search space, identifying a sibling node of the current node using a corresponding sibling link of the current node and performing the traversing operations with respect to the identified sibling node in which the identified sibling node is selected as the next current node used in the traversing operations and in which no traversing operations are performed for any child node of the current node responsive to determining that no coordinates associated with the current node are included in the search space;
    identifying at least one nearest neighbor node in a set of leaf nodes identified, by the traversing operations, as corresponding to the search space; and
    using the query point and a particular second point of the second point cloud that corresponds to the at least one nearest neighbor node for performing an operation.

2. The computer-implemented method of claim 1, wherein the traversing operations are performed directly on the compressed octree representation without having to decompress the compressed octree representation.

3. The computer-implemented method of claim 1, wherein the sibling link stores an index of the sibling node, the index identifying the sibling node in a linear array.

4. The computer-implemented method of claim 1, wherein the sibling link stores an offset value that stores a relative position of the sibling node with respect to the current node.

5. The computer-implemented method of claim 1, wherein the compressed octree representation is represented as a linear array of structures, each structure representing a node.

6. The computer-implemented method of claim 5, wherein the linear array of structures stores the nodes in a depth first search order of traversal of the compressed octree representation.

7. The computer-implemented method of claim 1, wherein each node is represented as a byte such that each bit of the byte indicates whether a child node is present.

8. The computer-implemented method of claim 1, wherein:
the search query is received by an autonomous vehicle; and
the operation comprises performing localization of the autonomous vehicle.

9. One or more non-transitory computer readable media storing instructions that in response to being executed by one or more processors, cause a computer system to perform operations, the operations comprising:
receiving a search query, the search query specifying a search space comprising a query-point and a search range, the query-point being included in a first point cloud comprising a first set of three-dimensional (3D) points that correspond to at least a portion of a region;
accessing a compressed octree representation of a second point cloud comprising a second set of 3D points that correspond to the region, the compressed octree representation comprising nodes, at least some of the nodes storing a sibling link to a sibling node having the same parent node;
traversing the compressed octree representation to identify one or more nodes that correspond to the search space, the traversing comprising selecting a current node of the compressed octree representation and performing traversing operations, the traversing operations including:
responsive to determining that the current node is a leaf node, marking the current node as corresponding to the search space,
responsive to determining that the current node is not a leaf node and determining that one or more coordinates associated with the current node are included in the search space, identifying a child node of the current node and performing the traversing operations with respect to the identified child node in which the identified child node is selected as the next current node used in the traversing operations, and
responsive to determining that no coordinates associated with the current node are included in the search space, identifying a sibling node of the current node using a corresponding sibling link of the current node and performing the in the traversing operations with respect to the identified sibling node in which the identified sibling node is selected as the next current node used in the traversing operations and in which no traversing operations are performed for any child node of the current node responsive to determining that no coordinates associated with the current node are included in the search space;
identifying at least one nearest neighbor node in a set of leaf nodes identified, by the traversing operations, as corresponding to the search space; and
using the query point and a particular second point of the second point cloud that corresponds to the at least one nearest neighbor node for performing an operation.

10. The one or more non-transitory computer-readable media of claim 9, wherein the traversing operations are performed directly on the compressed octree representation without having to decompress the compressed octree representation.

11. The one or more non-transitory computer-readable media of claim 9, wherein the sibling link stores an index of the sibling node, the index identifying the sibling node in a linear array.

12. The one or more non-transitory computer-readable media of claim 9, wherein the sibling link stores an offset value that stores a relative position of the sibling node with respect to the current node.

13. The one or more non-transitory computer-readable media of claim 9, wherein the compressed octree representation is represented as a linear array of structures, each structure representing a node.

14. The one or more non-transitory computer-readable media of claim 13, wherein the linear array of structures stores the nodes in a depth first search order of traversal of the compressed octree representation.

15. The one or more non-transitory computer-readable media of claim 9, wherein each node is represented as a byte such that each bit of the byte indicates whether a child node is present.

16. The one or more non-transitory computer-readable media of claim 9, wherein:
the search query is received by an autonomous vehicle; and
the operation comprises performing localization of the autonomous vehicle.

17. A computer system comprising:
one or more processors; and
one or more non-transitory computer readable media storing instructions that in response to being executed by the one or more processors, cause the computer system to perform operations, the operations comprising:
receiving a search query, the search query specifying a search space comprising a query-point and a search range;
accessing a compressed octree representation of a point cloud comprising three-dimensional (3D) points of a region, the compressed octree representation comprising nodes, at least some of the nodes storing a sibling link to a sibling node having the same parent node;
traversing the compressed octree representation to identify one or more nodes that correspond to the search space, the traversing comprising selecting a current node of the compressed octree representation and performing traversing operations, the traversing operations including:
responsive to determining that the current node is a leaf node and that one or more coordinates associated with the current node are included in the search space, marking the current node as corresponding to the search space,
responsive to determining that the current node is not a leaf node and determining that one or more coordinates associated with the the current node are included in the search space, identifying a child node of the current node and performing the traversing operations with respect to the identified child node in which the identified child node is selected as the next current node used in the traversing operations, and responsive to determining that no coordinates associated with the current node are included in the search space, identifying a sibling node of the current node using a corresponding sibling link of the current node and performing the the traversing operations with respect to the identified sibling node in which the identified sibling node is selected as the next current node used in the traversing operations and in which no traversing operations are performed for any child node of the current node responsive to determining that no coordinates associated with the current node are included in the search space;

identifying at least one nearest neighbor node in a set of leaf nodes identified, by the traversing operations, as corresponding to the search space; and using the at least one nearest neighbor node for performing an operation on the point cloud.

18. The computer system of claim 17, wherein the traversing operations are performed directly on the compressed octree representation without having to decompress the compressed octree representation.

19. The computer system of claim 17, wherein the sibling link stores an index of the sibling node, the index identifying the sibling node in a linear array.

20. The computer system of claim 17, wherein the sibling link stores an offset value that stores a relative position of the sibling node with respect to the current node.

21. The computer system of claim 17, wherein the compressed octree representation is represented as a linear array of structures, each structure representing a node.

22. The computer system of claim 21, wherein the linear array of structures stores the nodes in a depth first search order of traversal of the compressed octree representation.

23. The computer system of claim 17, wherein each node is represented as a byte such that each bit of the byte indicates whether a child node is present.

24. The computer system of claim 17, wherein:
the search query is received by an autonomous vehicle; and
the operation performed on the point cloud comprises performing localization of the autonomous vehicle.

* * * * *